(12) United States Patent
Sorani et al.

(10) Patent No.: US 12,459,399 B2
(45) Date of Patent: Nov. 4, 2025

(54) ON-BOARD ELECTRICAL SYSTEM FOR AN ELECTRIC VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Heza Sorani, Västra Frölunda (SE); Nils Höglund, Gothenburg (SE); Fehmi Fetiu, Gothenburg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/779,242

(22) Filed: Jul. 22, 2024

(65) Prior Publication Data

US 2024/0375545 A1 Nov. 14, 2024

Related U.S. Application Data

(63) Continuation of application No. PCT/CN2023/072829, filed on Jan. 18, 2023.

(30) Foreign Application Priority Data

Jan. 25, 2022 (EP) ..................... 22153346

(51) Int. Cl.
*B60L 58/20* (2019.01)
*B60L 3/00* (2019.01)

(52) U.S. Cl.
CPC ............. *B60L 58/20* (2019.02); *B60L 3/0046* (2013.01); *B60L 3/0069* (2013.01); *B60L 2210/10* (2013.01)

(58) Field of Classification Search
CPC ...... B60L 58/20; B60L 3/0046; B60L 3/0069; B60L 2210/10; B60L 53/20; B60L 53/57; Y02T 10/70
See application file for complete search history.

(56) References Cited

U.S. PATENT DOCUMENTS

| | | | |
|---|---|---|---|
| 2005/0151513 A1* | 7/2005 | Cook | H02J 7/1423 320/137 |
| 2013/0314024 A1 | 11/2013 | Proebstle et al. | |

(Continued)

FOREIGN PATENT DOCUMENTS

| | | |
|---|---|---|
| DE | 10313752 A1 | 10/2004 |
| EP | 3866294 A1 | 8/2021 |
| KR | 20140079626 A | 6/2014 |

OTHER PUBLICATIONS

International Search Report from corresponding International Application No. PCT/CN2023/072829, mailed on Apr. 4, 2023, 4 pages.

(Continued)

*Primary Examiner* — Lincoln D Donovan
*Assistant Examiner* — Alex W Lam
(74) *Attorney, Agent, or Firm* — Tucker Ellis LLP

(57) ABSTRACT

An electrical system for an electric vehicle includes a high-voltage power supply including a high-voltage storage system in series with a high-voltage switch, first and second low-voltage power supplies respectively having first and second low-voltage storage systems in series with first and second switches, a first DC/DC converter connected to the high-voltage power supply and the first low-voltage power supply via a first low-voltage DC bus, a second DC/DC converter connected to the high-voltage power supply and the second low-voltage power supply via a second low-voltage DC bus, first and second master control units respectively connected to the first and second low-voltage DC buses for power supply and controlling operation of the first (Continued)

and second switch, a first wake-up connector arrangement temporarily connectable to a low-voltage jump-starter device, first and second wake-up lines respectively connecting the first wake-up connector arrangement with the first and second low-voltage DC buses.

15 Claims, 9 Drawing Sheets

(56) References Cited

U.S. PATENT DOCUMENTS

| | | |
|---|---|---|
| 2017/0155266 A1* | 6/2017 | Namou ................. H01M 16/00 |
| 2017/0158058 A1* | 6/2017 | Lee ..................... H02J 7/00304 |
| 2017/0240059 A1 | 8/2017 | Weicker |
| 2019/0106003 A1 | 4/2019 | Heyne et al. |
| 2020/0016979 A1 | 1/2020 | Awad Alla et al. |
| 2023/0268755 A1* | 8/2023 | Huang .................. H02J 7/0013 320/118 |

OTHER PUBLICATIONS

Extended European Search Report from corresponding Application No. 22153346.6, mailed on Jul. 20, 2022, 8 pages.

* cited by examiner

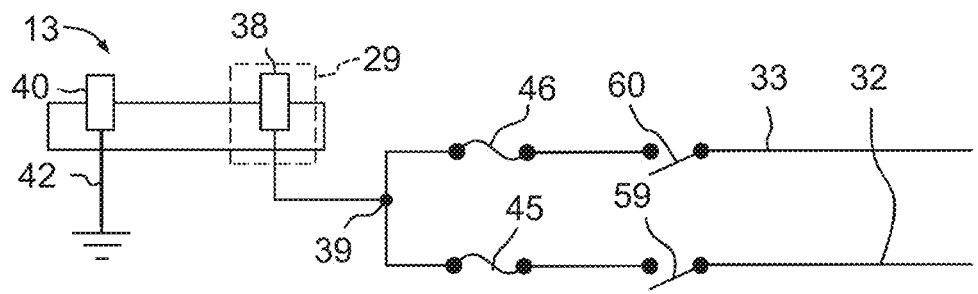
FIG. 13
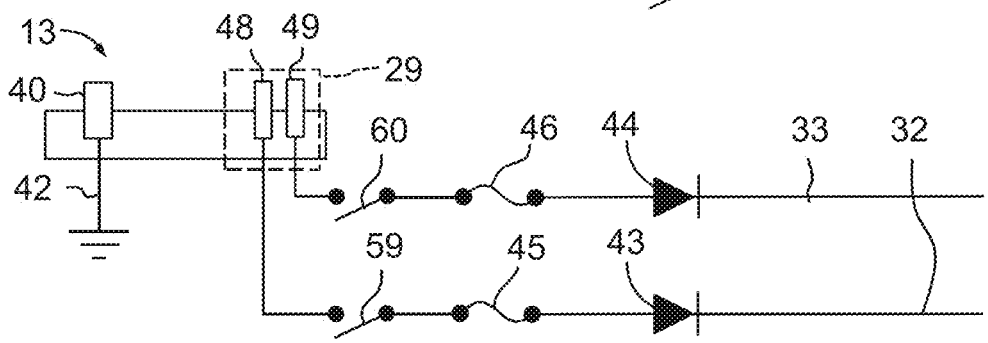
FIG. 14
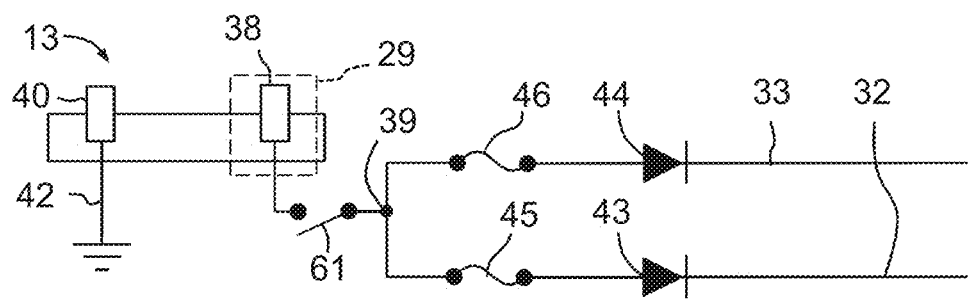
FIG. 15
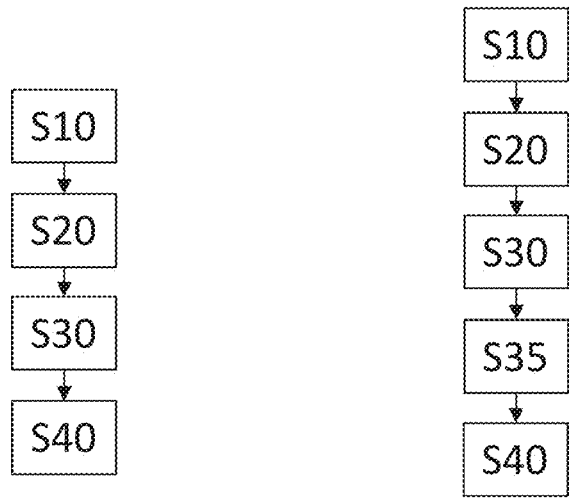
FIG. 16
FIG. 17

ON-BOARD ELECTRICAL SYSTEM FOR AN ELECTRIC VEHICLE

RELATED APPLICATION DATA

This application is a continuation of International Patent Application No. PCT/CN2023/072829, filed Dec. 15, 2022, and claims the benefit of European Patent Application No. 22153346.6, filed Jan. 25, 2022, the disclosures of which are incorporated herein by reference in their entireties.

TECHNICAL FIELD

The present disclosure relates to an on-board electrical system for an electric vehicle. The disclosure further relates to a method for starting an electric vehicle.

The on-board electrical system and associated method for starting an electric vehicle according to the disclosure will be described primarily in relation to a car, the electrical system and associated method are not restricted to this particular type of electric vehicle, but may as well be installed or implemented in another type of electric propulsion vehicles, such as a truck, a bus, a rail vehicle, a flying vehicle, a marine vessel, an off-road vehicle, a mining vehicle, an agriculture vehicle, a working vehicle such as a wheel loader or excavator, a forest vehicle such as harvesters or forwarders, a motorcycle or the like.

BACKGROUND

In the field of electric vehicles having an internal high-voltage (HV) electrical storage system and a low-voltage (LV) electrical storage system, a situation in which both said electrical storage systems have a low electrical charge level may be problematic, because starting and/or charging of any of said electrical storage systems may in certain circumstances not be possible by simply connecting the vehicle to a conventional high-voltage charger.

In particular, the HV electrical storage system (ESS) is generally provided with a switch for enabling disconnection of the HV ESS from a vehicle HV power supply bus when reaching a low charge level for reducing risk for damages to the HV EES due to low charging level. Similarly, also the LV electrical storage system (ESS) is generally provided with a switch for enabling disconnection of the LV ESS from a vehicle LV power supply bus when reaching a low charge level for reducing risk for damages to the LV EES due to low charging level.

However, opening of said LV switch may result in power loss to several relevant electrical components of an electric vehicle, such as the DC/DC converter typically used for connecting, and transferring electrical power between, the HV bus and the LV bus, as well as the electric control unit configured for controlling the LV switch.

In other words, a situation with opened HV switch and LV switch may cause a deadlock that is difficult to overcome.

It is known from for example US 2017/0240059 A1 to provide the vehicle with an external LV connector for enabling connection of an external LV charger for charging of the LV battery and for starting the vehicle. However, this known solution may be deemed having insufficient level of fault-tolerance.

There is thus a need for a vehicle electric system having improved fault tolerance while also providing a solution for overcoming the deadlock associated with opened HV switch and LV switch.

SUMMARY

An object of the present disclosure is to provide an on-board electrical system for an electric vehicle, as well as a method for starting an electric vehicle, that provides improved fault tolerance while also providing a solution for overcoming the deadlock associated with opened HV switch and LV switch.

This object is at least partly achieved by the features of the independent claims.

According to a first aspect of the present disclosure, there is provided an on-board electrical system for an electric vehicle comprising: a high-voltage electrical power supply including a high-voltage electrical storage system connected in series with a high-voltage switch; a first low-voltage power supply including a first low-voltage electrical storage system connected in series with a first electrical switch; a second low-voltage power supply including a second low-voltage electrical storage system connected in series with a second electrical switch; a first DC/DC converter connected to the high-voltage electrical power supply via a high-voltage DC bus and to the first low-voltage power supply via a first low-voltage DC bus; a second DC/DC converter connected to the high-voltage electrical power supply via the high-voltage DC bus and to the second low-voltage power supply via a second low-voltage DC bus; a first master electronic control unit connected to the first low-voltage DC bus for power supply and configured to controlling operation of the first electrical switch; a second master electronic control unit connected to the second low-voltage DC bus for power supply and configured to controlling operation of the second electrical switch; a first wake-up electrical connector arrangement suitable for being temporarily connected to a low-voltage jump-starter device; a first wake-up electrical line connecting the first wake-up electrical connection arrangement with the first low-voltage DC bus; and a second wake-up electrical line connecting the first wake-up electrical connector arrangement with the second low-voltage DC bus.

According to a second aspect of the present disclosure, there is provided a method for starting an electric vehicle having an on-board electrical system comprising a high-voltage electrical power supply including a high-voltage electrical storage system connected in series with a high-voltage switch, a first low-voltage power supply including a first low-voltage electrical storage system connected in series with a first electrical switch, a second low-voltage power supply including a second low-voltage electrical storage system connected in series with a second electrical switch, a first DC/DC converter connected to the high-voltage electrical power supply and to the first low-voltage power supply via a first low-voltage DC bus, and a second DC/DC converter connected to the high-voltage electrical power supply and to the second low-voltage power supply via a second low-voltage DC bus, The method comprising: connecting an external charging connector of an external charging unit to an on-board charging inlet of the on-board electrical system, connecting a connector of a low-voltage jump-starter device to a first wake-up electrical connector arrangement of the on-board electrical system, supplying electrical power from the low-voltage jump-starter device to the first low-voltage DC bus of the on-board electrical system, via a first wake-up electrical line, for powering and wakening a first master electronic control unit, and/or supplying electrical power from the low-voltage jump-starter device to the second low-voltage DC bus of the on-board electrical system, via a second wake-up electrical line, for powering and wakening a second master electronic control unit, wakening an on-board charger that is operably connected to the on-board charging inlet and wakening the first and/or a second DC/DC converters for initiating power supply from the on-board charging inlet to the first and/or second low-voltage bus, and closing the first electrical switch for initiating charging of the first low-voltage electrical storage system with power from the first DC/DC converter, and/or closing the second electrical switch for initiating charging of the second low-voltage electrical storage system with power from the second DC/DC converter.

In this way, due the redundant first and second low-voltage power supplies, various safety critical loads may also be implemented with redundancy, thereby providing significantly increased operation safety for example steer-by-wire solutions or high-level self-driving systems. In addition, the first and second wake-up electrical lines provide separate low-voltage power supply from the low-voltage jump-starter device to the first and second low-voltage buses for enabling starting up of the first and second master electronic control units despite first and second electrical switches 19, 21 are set in open state, thereby enabling improved fault-tolerance, since the first and second low-voltage buses may be separated and having no direct connection, or even being entirely galvanically separated from each other during normal operation of the electric system.

Further advantages are achieved by implementing one or several of the features of the dependent claims.

In some example embodiments, the on-board electrical system further comprises a current blocking structure configured for preventing current from flowing from the first low-voltage DC bus to the second low-voltage DC bus, or oppositely, via the first and second wake-up electrical lines. This feature also provides improved fault-tolerance, since the first and second low-voltage buses may be separated and having no direct connection, such that an error in one low-voltage bus does not render also the other low-voltage bus non-operational. This is valid at least while low-voltage jump-starter device is disconnected from a first wake-up electrical connector arrangement.

In some example embodiments, the on-board electrical system further comprises a first diode positioned in the first wake-up electrical line and arranged for allowing an electric current to pass in a direction from the first wake-up electrical connection arrangement to the first low-voltage DC bus, while blocking any current from passing in a direction from the first low-voltage DC bus to the first wake-up electrical connector arrangement, and wherein the on-board electrical system further comprises a second diode arranged in the second wake-up electrical line and arranged for allowing an electric current to pass in a direction from the first wake-up electrical connection arrangement to the second low-voltage DC bus, while blocking any current from passing in a direction from the second low-voltage DC bus to the first wake-up electrical connector arrangement. This arrangement of the diodes not only prevents current flow in-between the first and second low-voltage DC buses via the first and second wake-up electrical lines, for the purpose of providing improved fault-tolerance, but this arrangement of the diodes also contributes to a central reverse polarity protection of the electric system. A reverse polarity protection system, which us typically used for handling possible incorrect connection of the low-voltage jump-starter device to the wake-up electrical connector, is conventionally often implemented in each ECU separately, such as for example the DC/DC ECU's, on-board charger ECU, and the like. Consequently, such as central and single reverse polarity arrangement clearly offers many advantages in terms of cost.

In some example embodiments, that may be combined with any one or more of the above-described embodiments, the first wake-up electrical connector arrangement comprises first and second individual and mutually electrically disconnected connector members, wherein the first wake-up electrical line connects the first connector member with the first low-voltage DC bus, and wherein the second wake-up electrical line connects the second connector member with the second low-voltage DC bus. Thereby, fault-tolerance is improved, because the first and second wake-up electrical lines are galvanically separated, such that malfunction of one of the low-voltage DC buses does not negatively affect the proper operation of the other low-voltage DC bus.

In some example embodiments, that may be combined with any one or more of the above-described embodiments, the first and second connector members of the first wake-up electrical connector are arranged close to each other and therefore suitable for being jointly clamped by and connected to the positive clamp of a low-voltage jump-starter device, such that the positive clamp establishes an electrical connection between the first and second connector members. Thereby, simplified connection of the positive clamp is accomplished, while still providing the advantageous fault-tolerance described above.

In some example embodiments, that may be combined with any one or more of the above-described embodiments, the first wake-up electrical connector arrangement comprises a single connector member, which is suitable for being clamped by and connected to the positive clamp of a low-voltage jump-starter device, wherein the first wake-up electrical line connects the single connector member with the first low-voltage DC bus, and wherein the second wake-up electrical line connects the single connector member with the second low-voltage DC bus. This arrangement enables a more compact design of the first wake-up electrical connector arrangement, which may also be deemed more user-friendly because it is more intuitive to use for the person skilled in the art.

In some example embodiments, that may be combined with any one or more of the above-described embodiments, the on-board electrical system further comprises a second wake-up electrical connector arrangement suitable for being temporarily clamped by and connected to a negative clamp of the low-voltage jump-starter device, wherein the first and second wake-up electrical connector arrangements are located adjacent to each other. Thereby, a compact and user-friendly design is accomplished that is intuitive to use for the person skilled in the art.

In some example embodiments, that may be combined with any one or more of the above-described embodiments, the second wake-up electrical connector arrangement comprises a single connector member, which is suitable for being clamped by and connected to the negative clamp of a low-voltage jump-starter device, wherein an earth line connects the single connector member with an electrical earth of the vehicle.

In some example embodiments, the on-board electrical system for an electric vehicle further comprises an electric propulsion motor connector to the high-voltage electrical power supply via a motor controller.

In some example embodiments, the first and second low-voltage DC buses are electrically disconnected from each other. This provides improved fault-tolerance against malfunction of any of said buses.

In some example embodiments, that may be combined with any one or more of the above-described embodiments, the on-board electrical system further comprises a first fuse arranged in the first wake-up electrical line, and a second fuse arranged in the second wake-up electrical line. This may provide a certain level of over-current protection during wakening of a vehicle.

In some example embodiments, that may be combined with any one or more of the above-described embodiments, the first master electronic control unit is configured to, upon starting up of the first master electronic control unit and detecting an opened first electrical switch; activating an on-delay-timer for delaying closing of the first electrical switch a certain delay time; and closing the first electrical switch after the delay time of the on-delay-timer has passed, and/or the second master electronic control unit is configured to, upon starting up of the second master electronic control unit and detecting an opened second electrical switch; activating an on-delay-timer for delaying closing of the second electrical switch a certain delay time; and closing the second electrical switch after the delay time of the on-delay-timer has passed. Thereby, a protection against high and potentially damaging in-rush current is provided.

In some example embodiments, that may be combined with any one or more of the above-described embodiments, the first master electronic control unit is configured to, upon starting up of the first master electronic control unit and detecting an opened first electrical switch and detecting a low State of Charge condition of the first low-voltage electrical storage system; activating an on-delay-timer for delaying closing of the first electrical switch a certain delay time; and closing the first electrical switch after the delay time of the on-delay-timer has passed, and/or the second master electronic control unit is configured to, upon starting up of the second master electronic control unit and detecting an opened second electrical switch and detecting a low State of Charge condition of the second low-voltage electrical storage system; activating an on-delay-timer for delaying closing of the second electrical switch a certain delay time; and closing the second electrical switch after the delay time of the on-delay-timer has passed. By taking also state of charge level of the first and second low-voltage electrical storage systems into account, and initiating the delay only when the charge level is low, the first and second electrical switch may be closed immediately upon starting of the first and second master electronic control units.

In some example embodiments, that may be combined with any one or more of the above-described embodiments, the first master electronic control unit is configured to, upon starting up of the first master electronic control unit and detecting an opened first electrical switch and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus, and/or the second master electronic control unit is configured to, upon starting up of the second master electronic control unit and detecting an opened second electrical switch and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus. This control strategy for closing of the first and second electrical switch is more reliable and user-friendly, because there is no need for a user or a service personnel to read and accurately follow certain instructions.

In some example embodiments, that may be combined with any one or more of the above-described embodiments, the first master electronic control unit is configured to, upon starting up of the first master electronic control unit and detecting an opened first electrical switch and detecting a low State of Charge condition of the first low-voltage electrical storage system and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus, and/or the second master electronic control unit is configured to, upon starting up of the second master electronic control unit and detecting an opened second electrical switch and detecting a low State of Charge condition of the second low-voltage electrical storage system and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus. By taking also state of charge level of the first and second low-voltage electrical storage systems into account, and initiating the delay only when the charge level is low, the first and second electrical switch may in certain situations be closed immediately upon starting of the first and second master electronic control units.

In some example embodiments, that may be combined with any one or more of the above-described embodiments, the first master electronic control unit is configured for detecting an operating condition of the first DC/DC converter, and delaying closing of the first electrical switch at least until the first DC/DC converter has started to supply a low-voltage output to the first low-voltage DC bus, and/or the second master electronic control unit is configured for detecting an operating condition of the second DC/DC converter, and delaying closing of the second electrical switch at least until the second DC/DC converter has started to supply a low-voltage output to the second low-voltage DC bus. This criterion may be useful for ensuring the charging of the first and second low-voltage electrical storage systems is performed by means of the first and second DC/DC converters, which generally include charging current regulators.

In some example embodiments, that may be combined with any one or more of the above-described embodiments, the on-board electrical system further comprises an on-board charging inlet and an on-board charger, wherein the on-board charging inlet is configured to be connected to an external charging connector of an external charging unit, and wherein the on-board charger is operably connected to the on-board charging inlet and to the high-voltage bus for enabling charging of the high-voltage battery with electrical power supplied from the external charging unit.

In some example embodiments, that may be combined with any one or more of the above-described embodiments, operation of the high-voltage switch is controlled jointly by the first and second master electronic control units, or by each of the first and second master electronic control units separately, and first and/or second master electronic control units are configured for closing the high-voltage switch first after the first and/or second low-voltage electrical storage system has been charged to a certain State of Charge. If all of the high-voltage electrical storage system and first and/or second low-voltage electrical storage systems are charged simultaneously, most of the charging power will generally go to the high-voltage electrical storage system, and this may prolong the time period until the first and/or second low-voltage electrical storage systems have received sufficient charge level.

The disclosure also relates to vehicle comprising the on-board electrical system as described above, in particular a vehicle having electrically operated doors, such as for example electrically operated sliding doors.

In some example embodiments, that may be combined with any one or more of the above-described embodiments, the method may further comprise the step of stopping power supply from the low-voltage jump-starter device to the first and/or second low-voltage DC bus before closing the first and/or second electrical switches. Thereby, the risk for potentially damaging in-rush charging current to the first and second low-voltage electrical storage system may be reduced.

In some example embodiments, that may be combined with any one or more of the above-described embodiments, the step of closing the first and/or second electrical switches involves: detecting operating state of the first electrical switch, and upon detecting an opened first electrical switch; activating an on-delay-timer for delaying closing of the first electrical switch a certain delay time; and closing the first electrical switch after the delay time of the on-delay-timer has passed, and/or detecting operating state of the second electrical switch, and upon detecting an opened second electrical switch; activating an on-delay-timer for delaying closing of the second electrical switch a certain delay time; and closing the second electrical switch after the delay time of the on-delay-timer has passed. Thereby, a protection against high and potentially damaging in-rush current to the first and second low-voltage electrical storage system is provided.

In some example embodiments, that may be combined with any one or more of the above-described embodiments, the step of closing the first and/or second electrical switches involves: detecting operating state of the first electrical switch and State of Charge condition of the first low-voltage electrical storage system, and upon detecting an opened first electrical switch and detecting a low State of Charge condition of the first low-voltage electrical storage system; activating an on-delay-timer for delaying closing of the first electrical switch a certain delay time; and closing the first electrical switch after the delay time of the on-delay-timer has passed, and/or detecting operating state of the second electrical switch and State of Charge condition of the second low-voltage electrical storage system, and upon detecting an opened second electrical switch and detecting a low State of Charge condition of the second low-voltage electrical storage system; activating an on-delay-timer for delaying closing of the second electrical switch a certain delay time; and closing the second electrical switch after the delay time of the on-delay-timer has passed. By taking also state of charge level of the first and second low-voltage electrical storage systems into account, and initiating the delay only when the charge level is low, the first and second electrical switch may be closed immediately upon starting of the first and second master electronic control units.

In some example embodiments, that may be combined with any one or more of the above-described embodiments, the step of closing the first and/or second electrical switches involves: detecting operating state of the first electrical switch and connection status of the first wake-up electrical connector arrangement indicating power supply from the low-voltage jump-starter device to the first low-voltage DC bus; and upon detecting an opened first electrical switch and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus, and/or detecting operating state of the second electrical switch and connection status of the first wake-up electrical connector arrangement indicating power supply from the low-voltage jump-starter device to the second low-voltage DC bus; and upon detecting an opened second electrical switch and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus. This control strategy for closing of the first and second electrical switch is more reliable and user-friendly, because there is no need for a user or a service personnel to read and accurately follow certain instructions.

In some example embodiments, that may be combined with any one or more of the above-described embodiments, the step of closing the first and/or second electrical switches involves: detecting operating state of the first electrical switch, State of Charge condition of the first low-voltage electrical storage system and connection status of the first wake-up electrical connector arrangement indicating power supply from the low-voltage jump-starter device to the first low-voltage DC bus; and upon detecting an opened first electrical switch and detecting a low State of Charge condition of the first low-voltage electrical storage system and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus, and/or detecting operating state of the second electrical switch, State of Charge condition of the second low-voltage electrical storage system and connection status of the first wake-up electrical connector arrangement indicating power supply from the low-voltage jump-starter device to the second low-voltage DC bus; and upon detecting an opened second electrical switch and detecting a low State of Charge condition of the second low-voltage electrical storage system and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus. By taking also state of charge level of the first and second low-voltage electrical storage systems into account, and initiating the delay only when the charge level is low, the first and second electrical switch may be closed immediately upon starting of the first and second master electronic control units.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The electrical system and method according to the disclosure will be described in detail in the following, with reference to the attached drawings, in which FIGS. 13-15 show schematically various alternative embodiments of the wake-up electrical connector arrangement and associated first and second wake-up electrical lines, and FIGS. 16-17 show schematically the basic steps of two example embodiments of the method according to the disclosure.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
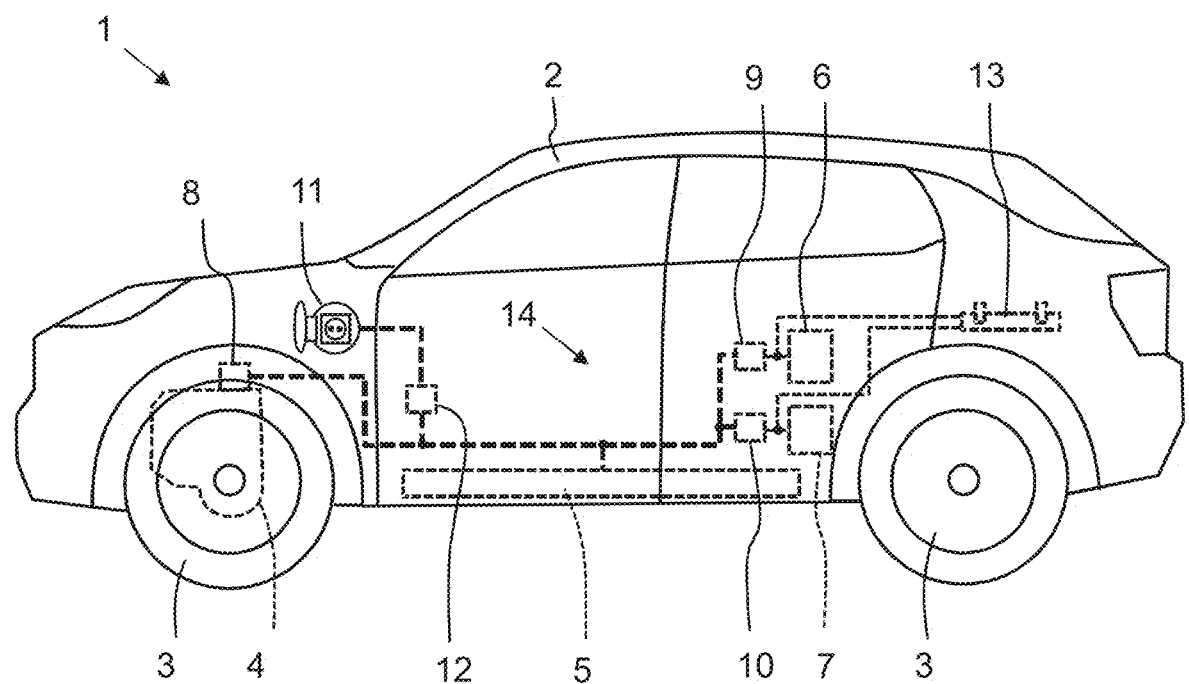
FIG. 1 shows schematically a side-view of a vehicle having an example embodiment of the electrical system according to the disclosure.

FIG. 1 schematically shows a side view of an electrical vehicle 1, such as a car, having a body 2, front and rear wheels 3 and on-board electrical system 14 according to the present disclosure. The on-board electrical system 14 comprises an electric propulsion motor 4 drivingly connected to one or more wheels 3, a high-voltage (HV) electrical storage system 5, a first low-voltage (LV) electrical storage system 6, and a second low-voltage (LV) electrical storage system 7.

The provision of parallel connected redundant first and second low-voltage electrical storage systems 6, 7 provides improved fault tolerance against various failure scenarios, thereby enabling increased operational safety to various safety critical low-voltage loads that are connected to said first and second low-voltage electrical storage systems 6, 7.

The electric propulsion motor 4 may for example be a single-phase or multi-phase AC motor or a DC-motor, and the vehicle 1 may include more than one propulsion motor 4 for enabling for example all-wheel drive, torque vectoring, wheel hub motors, or the like.

The electric propulsion motor 4 is connected to the high-voltage electrical storage system 5 via a motor controller 8, such as for example an inverter.

The HV electrical storage system 5 may include an electric battery having a plurality of electrochemical cells. For example, the HV battery may be a Lithium-Ion battery having a certain nominal voltage level, such as for example at least 60 Volt, specifically at least 200V. In some example embodiments, the nominal voltage level of the HV battery be in the range of 200-2000 V. The HV electrical storage system 5 may additionally, or alternatively, include one or more super capacitors.

Each of the first and second LV electrical storage systems 6, 7 may for example include a battery, such as a 12 volt battery, or alternatively having another voltage level, such as for example in the range of 12-59 volt. The LV batteries may for example be Lead-Acid batteries, Lithium-Ion batteries, or some other type of batteries. Each of the LV electrical storage systems 6, 7 may additionally, or alternatively, include one or more super capacitors.

The high-voltage electrical storage system 5 may be connected to the first low-voltage electrical storage system 6 via a first DC/DC converter 9. Furthermore, the high-voltage electrical storage system 5 may be connected to the second low-voltage electrical storage system 6 via a second DC/DC converter 10. Thereby, the first and second low-voltage electrical storage systems 6, 7 may be charged using electrical power from the HV electrical storage system 5, and possibly also oppositely.

The vehicle is equipped with two LV electrical storage systems 6, 7 for providing a redundant low-voltage power supply. This may be appropriate or even required when the vehicle includes one or more drive-by-wire systems, because such systems may need redundant low-voltage power supply to ensure sufficient and/or regulated driving safety. Furthermore, self-driving driving vehicles may also require redundant low-voltage power supply for certain safety critical driving systems, such as for example electric steering system, electric braking system, obstacle detection system, navigation system, electronic controllers, the like.

The vehicle further comprises an on-board charging inlet 11 and an on-board charger 12. The on-board charging inlet 11 may for example be an electric socket easily accessibly on the outside of the vehicle 1 and configured to receive an electric charging plug or charging connector 34 of a stationary external charging unit 35. Such stationary charging units are for example available at public charging stations or at the home, and they are connected to the electric power grid. Alternatively, the on-board charging inlet may be part of a wire-less charging pad arrangement configured for receiving electric power from the electric grid wirelessly, e.g. by inductive power transfer from a stationary ground pad to vehicle mounted receiving pad.

The on-board charger 12 is operably connected to the on-board charging inlet 11 and to the high-voltage electrical storage system 5 for converting the received electrical power from the grid to a form suitable for charging of the high-voltage electrical storage system 5 and first and second LV electrical storage systems 6, 7.

The vehicle further includes a wake-up electrical connector 13 for enabling temporary connection of an external booster, i.e. a low-voltage charging unit, to the vehicle on-board electrical system for powering-up of first and second low-voltage buses associated with the first and second LV electrical storage systems 6, 7.

If the vehicle have electric doors, these may be difficult to open in case of drained HV and LV storage systems 5-7, and in such cases it may be advantageous to have the wake-up electrical connector 13 accessible from the outside of the vehicle, or within a trunk or frunk or the like if these may be opened mechanically without need for electrical vehicle power.

Figure 2:
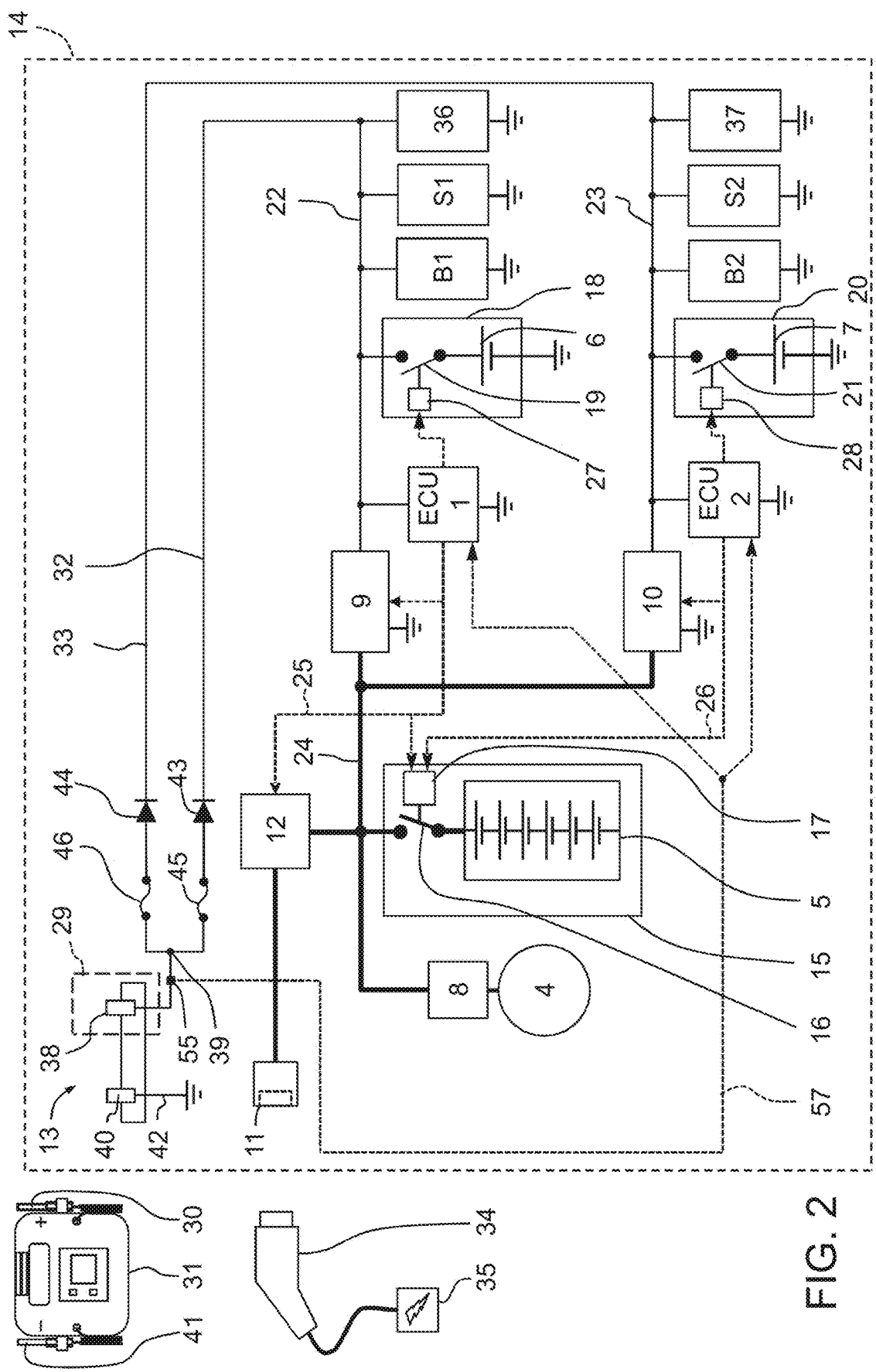
FIGS. 2-5 show schematically various alternative embodiments of the electric system of the disclosure.

FIG. 2 shows schematically a more detailed view of an example embodiment of the on-board electrical system 14 according to the disclosure. The on-board electrical system 14 comprises a high-voltage electrical power supply 15 including a high-voltage electrical storage system 5 connected in series with a high-voltage switch 16, such as a contactor, electromagnetic relay or solid state switch. A battery management system (BMS) 17 of the high-voltage electrical storage system 5 controls operation of the high-voltage switch 16.

The on-board electrical system 14 further comprises a first low-voltage power supply 18 including a first low-voltage electrical storage 6 system connected in series with a first electrical switch 19, and a second low-voltage power supply 20 including a second low-voltage electrical storage system 7 connected in series with a second electrical switch 21.

A battery management system (BMS) 27 of the first low-voltage power supply 18, or the like, may be provided for controlling operation of the first electrical switch 19, and a battery management system (BMS) 28 of the second low-voltage power supply 20, or the like, may be provided for controlling operation of the second electrical switch 21.

The first and second low-voltage power supplies 18, 20 provide a redundant low-voltage power supply. This is may be required in drive-by-wire systems. Furthermore, level 3-5 of autonomous vehicles (AVs) must generally be designed to have appropriate levels of fault tolerance in hardware, and this is accomplished by redundant low-voltage power supply to certain safety critical electrical loads.

For example, a redundant vehicle braking system may include first and second braking modules B1, B2, each powered by an individual low-voltage power supply 18, 20, such that failure of one of the low-voltage power supplies 18, 20 or one of the braking modules B1, B2 will not prevent the vehicle from having operational braking capacity, namely by means of the other, fault-free, low-voltage power supply 18, 20 or braking module B1, B2. Each of the first and second braking modules B1, B2 may for example include an electronic braking controller and/or a braking actuator.

Similarly, a redundant vehicle steering system may include first and second steering modules S1, S2, each powered by an individual low-voltage power supply 18, 20, such that failure of one of the low-voltage power supplies 18, 20 or one of the steering modules S1, S2 will not prevent the vehicle from having operational steering capacity, namely by means of the other, fault-free, low-voltage power supply 18, 20 or steering module S1, S2. Each of the first and second steering modules S1, S2 may for example include an electronic braking controller and/or a steering actuator.

The vehicle also needs redundant electronic control units for enabling fault-tolerant control of the various parts and systems of the vehicle powertrain. These redundant control units are herein referred to as first and second master electronic control units ECU1, ECU2. The first master electronic control unit ECU1 is configured to receive electrical power from for first low-voltage power supply 18, and the second master electronic control unit ECU2 is configured to receive electrical power from for second low-voltage power supply 20.

In the example embodiment of FIG. 2, the first master electronic control unit ECU1 is configured to control operation of the first DC/DC converter 9 and operation of the on-board charger 12, as indicated by a first data communication line 25, which reflects a data communication channel, such as a data bus or the like. Furthermore, the second master electronic control unit ECU2 is configured to control operation of the second DC/DC converter 9, as indicated by a second data communication line 26, which reflects a data communication channel, such as a data bus or the like.

In other words, the first low-voltage power supply 18 may be connected to, and configured to supply electrical power to, a first low-voltage DC bus 22, and various electrical loads may be connected to the first low-voltage DC bus 22, such as the first master electronic control unit ECU1, the first steering module S1 and/or or the first braking module B1. Similarly, the second low-voltage power supply 20 may be connected to, and configured to supply electrical power to, a second low-voltage DC bus 23, and various electrical loads may be connected to the second low-voltage DC bus 23, such as the second master electronic control unit ECU2, the second steering module S2 and/or or the second braking module B2.

Other low-voltage electrical loads 36, 37 may also be connected to the first or second low-voltage DC buses 22, 23.

As mentioned above, the on-board electrical system 14 further comprises a first DC/DC converter 9 operably connecting the high-voltage electrical power supply 15 with the first low-voltage power supply 18, and a second DC/DC converter 10 operably connecting the high-voltage electrical power supply 15 with the second low-voltage power supply 20. Thereby a satisfactory level of redundancy is accomplished, because the first and second low-voltage power supplies 18, 20 are less interconnected. For example, failure of the first DC/DC converter 9 would still enable the second DC/DC converter 10 to be operational, or at least not negatively affect the correct and reliable operation of the second low-voltage power supply 20 and associated safety critical redundant electrical load(s) S2, B2.

In some example embodiments, low-voltage power to the first and second low-voltage DC buses 22, 23 is normally supplied primarily from the first and second DC/DC converters 9, 10, and the first and second low-voltage electrical storage systems 6, 7 are primarily kept in a fully charged state and ready for use in case of failure of the high-voltage electrical power supply 15 or the like.

The first DC/DC converter 9 may for example be connected with the first low-voltage power supply 18 via a first low-voltage DC bus 22, and the second DC/DC converter 10 may for example be connected with the second low-voltage power supply 20 via a second low-voltage DC bus 23.

Furthermore, both the first and second DC/DC converters 9, 10 may for example be connected with the high-voltage electrical power supply 15 via a high-voltage DC bus 24.

The high-voltage DC bus and first and second low-voltage DC buses may be implemented in various alternative ways. For example, one or more of the DC buses may be implemented in form of a rigid or flexible electrical conductor arrangement joining all relevant electrical components/loads of the bus. Alternatively, one or more of the DC buses may be implemented in form of power distribution Unit (PDU) or junction box or the like that interconnects some or all of the electrical components/loads of the bus. In other words, in electric and hybrid electric vehicle applications, a high-voltage or low-voltage DC bus generally refers to conductor installation that enables multiple electric devices, such as power sources, power converter units, energy storage systems, loads, etc., to be inter-connected and to share electrical power among each other.

The first master electronic control unit ECU1 may be configured for controlling operation of the first electrical switch 19 via the BMS 27 of the first low-voltage power supply 18, and the second master electronic control unit ECU2 may be configured for controlling operation of the second electrical switch 21 via the BMS 28 of the second low-voltage power supply 20.

The on-board electrical system 14 further comprises a first wake-up electrical connector arrangement 29 suitable for being temporarily clamped by and connected to a positive clamp 30 of a low-voltage, e.g. 12V, jump-starter device 31.

The first wake-up electrical connector arrangement 29 comprises for example a single-piece connector member 38, such as a single rigid post, terminal, pin, screw, or the like, that is suitable for being temporarily clamped by said positive clamp 30. The positive clamp 30 is for example a manually operable spring-loaded clamp, which as such is well-known for the person skilled in the art in area of for example battery chargers. As mentioned above, the first wake-up electrical connector arrangement 29 may in some example embodiments preferably be arranged at a location on the vehicle where it is accessible despite locked vehicle doors. The first wake-up electrical connector arrangement 29 may thus for example be located in under an openable hood or cover, or in the frunk or trunk. In other example embodiments, the first wake-up electrical connector arrangement 29 may be located within the vehicle, for example under a seat or the like.

The low-voltage jump-starter device 31, also sometimes known as a booster, is for example a hand-held mobile device having an internal low-voltage electrical storage system, such as a 12V battery, that is suitable for powering up a low-voltage DC bus and/or charging a low-voltage power supply.

The on-board electrical system 14 further comprises a first wake-up electrical line 32 connecting the first wake-up electrical connection arrangement 29 with the first low-voltage DC bus 22, and a second wake-up electrical line 33 connecting the first wake-up electrical connector arrangement 29 with the second low-voltage DC bus 23. Specifically, in the example embodiment of FIG. 2, the first wake-up electrical line 32 connects the single connector member 38 with the first low-voltage DC bus 22, and the second wake-up electrical line 33 connects the single connector member 38 with the second low-voltage DC bus 23.

Thereby, a deadlock situation involving an opened high-voltage switch 16 and opened first and second electrical switches 19, 21, may be overcome in a fast and simple manner.

Such a deadlock situation may for example be caused by long time parking without charging, because the batteries will then be slowly drained until for example the BMS 17, 27, 28 opens said switches 16, 19, 21 for protecting the high-voltage and low-voltage electrical storage systems 5, 6, 7 from excessive drain level, i.e. too low charging level. Alternatively, such deadlock may also occur for example during manufacturing of the vehicle when all said switches are still opened and must be closed for the first time for enabling driving of the vehicle. Still more alternatively, such deadlock may also occur for example during repair or service of the vehicle, because this may require opened high-voltage switch 16 and first and second electrical switches 19, 21 for safety or regulation reasons.

The difficulty with opened high-voltage switch 16 and opened first and second electrical switches 19, 21 is that the charging of the high-voltage and/or low-voltage electrical storage systems 5, 6, 7 via the conventional on-board charging inlet 11 is not possible, because the on-board charger 12 and the first DC/DC converter 9 are generally not operational unless the first master electronic control unit ECU1 is operational, and the second DC/DC converter 9 is generally not operational unless the second master electronic control unit ECU2 is operational, but the first and second master electronic control units ECU1, ECU2 are out of power as long as the first and second electrical switches 19, 21, respectively, are opened.

This situation is solved according to the present disclosure by connecting the external charging connector 34 of an external charging unit 35 to the on-board charging inlet 11, and by connecting the jump-starter device 31 to the first wake-up electrical connector arrangement 29 for supplying electrical power to the first and second low-voltage DC buses 22, 23 and further to the first and second master electronic control units ECU1, ECU2.

When the first and second low-voltage DC buses 22, 23 received power from the jump-starter device 31 and the first and second master electronic control units ECU1, ECU2 has started-up, they will activate the on-board charger 12 and the first and second DC/DC converters 9, 10, thereby establishing power supply to the first and second master electronic control units ECU1, ECU2 with power from the external charging unit 35.

At this stage, the jump-starter device 31 may be disconnected and the first and second master electronic control units ECU1, ECU2 may close the high-voltage switch 16 and first and second electrical switches 19, 21 for enabling charging of the high-voltage and/or low-voltage electrical storage systems 5, 6, 7 with power from the external charging unit 35.

Consequently, the design of the on-board electrical system 14 according to the present disclosure solves the problem of starting an electric vehicle with redundant low-voltage DC buses 22, 23 having each of the high-voltage switch 16 and first and second electrical switches 19, 21 in opened state.

The first and second wake-up electrical lines 32, 33 enables supply of electric power from the jump-starter device 31 to each of the first and second master electronic control units ECU1, ECU2 separately. This design of the on-board electrical system 14 enables improved fault tolerance, because it eliminates the need for a direct electrical connection between the first and second low-voltage DC buses 22, 23 that would be necessary if the on-board electrical system 14 would merely include a single wake-up electrical line connecting the first wake-up electrical connector arrangement 29 with one of the first and second low-voltage DC buses 22, 23.

Others said, if the on-board electrical system merely includes a single wake-up electrical line connecting the first wake-up electrical connector arrangement 29 with for example only the first low-voltage DC bus 22, the on-board electrical system would need a direct electrical connection between the first and second low-voltage DC buses 22, 23 for enabling supply of power to the second low-voltage DC bus 23 for powering up the second master electronic control unit ECU2. However, such a direct electrical connection between the first and second low-voltage DC buses 22, 23 would represent a weakness in terms of fault-tolerance because a short-circuit of for example load B1 would not only cause the first low-voltage DC bus 22 to fail, but the second low-voltage DC bus 22 would also fail because current could pass from the second low-voltage bus 23 and/or second low-voltage power supply 20 to the ground of load B2 via said direct electrical connection.

Each of the first and second wake-up electrical lines 32, 33 may be separately connected to the first wake-up electrical connector arrangement 29. Alternatively, the first and second wake-up electrical lines 32, 33 be mutually connected at a connection point 39, which is connected to the first wake-up electrical connector arrangement 29 by a single line.

The wake-up electrical connector 13 further comprises a second wake-up electrical connector arrangement 40 suitable for being temporarily clamped by and connected to a negative clamp 41 of the low-voltage jump-starter device 31, wherein the first and second wake-up electrical connector arrangements 29, 40 are located adjacent to each other.

Figure 6:
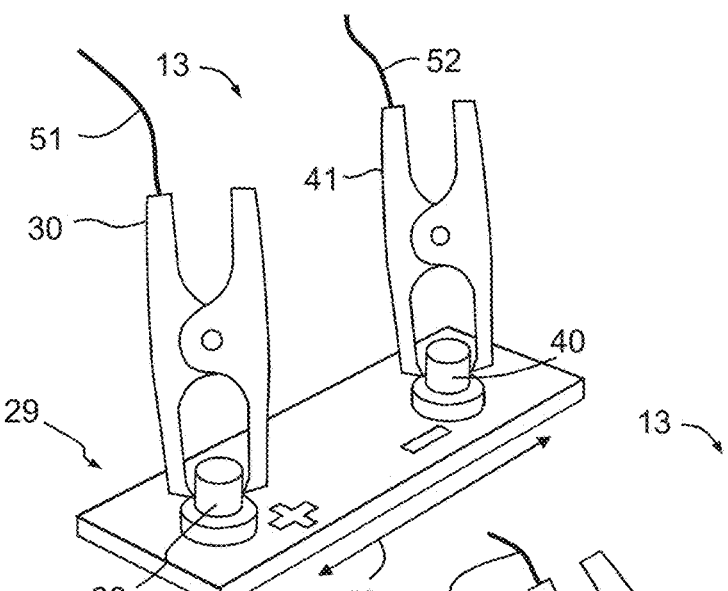
FIGS. 6-10 show schematically various alternative embodiments of the connectors of the low-voltage jump-starter device and wake-up electrical connector arrangement.

FIG. 6 shows an example embodiment of the wake-up electrical connector 13 for enabling temporary connection of an external booster to the on-board electrical circuit 14. In this example embodiment, the first wake-up electrical connector arrangement 29 comprises a single-piece connector member 38 in form of single rigid post that is temporarily clamped by the positive clamp 30 that is connected to the low-voltage jump-starter device 31 via a positive electrical cable 51, and the second wake-up electrical connector arrangement 40 also comprises a single-piece connector member in form of single rigid post that is temporarily clamped by the negative clamp 41 that is connected to the low-voltage jump-starter device 31 via negative electrical cable 52.

For example, the first and second wake-up electrical connector arrangements 29, 40 are located within a distance 50 of less than 50 cm from each other for enabling a user to more easily understand how to connect a low-voltage jump-starter device 31 to the wake-up electrical connector 13, and for enabling a more easy connection of the positive and negative clamps 30, 41 to the wake-up electrical connector 13.

An earth line 42 connects the second wake-up electrical connector arrangement 40 with an electrical earth of the electrical system 14.

The second wake-up electrical connector arrangement 40 may for example be implemented in form of a single connector member, such as a single rigid post, that is suitable for being clamped by and connected to the negative clamp of a low-voltage jump-starter device.

In the event that the first and second wake-up electrical lines 32, 33 are mutually connected, it may be desirable to provide the on-board electrical system with a current blocking structure configured for preventing current from flowing from the first low-voltage DC bus to the second low-voltage DC bus, or oppositely, via the first and second wake-up electrical lines, at least while low-voltage jump-starter device 31 is disconnected from the wake-up electrical connector 13, for the purpose of providing improved fault-tolerance against failures and for ensuring a high power supply availability to the safety critical low-voltage loads S1, S2, B1, B2.

In the example embodiment of FIG. 2, the first and second wake-up electrical lines 32, 33 are mutually connected at the connection point 39 and a current blocking structure in form of two series connected and oppositely arranged diodes in the first and second wake-up electrical lines 32, 33 are provided.

In particular, the on-board electrical system further comprises a first diode 43 positioned in the first wake-up electrical line 32 and arranged for allowing an electric current to pass in a direction from the first wake-up electrical connection arrangement 29 to the first low-voltage DC bus 22, i.e. along the diode's forward direction, while blocking any current from passing in a direction from the first low-voltage DC bus 22 to the first wake-up electrical connector arrangement 29, i.e. the diode's reverse direction.

Moreover, the on-board electrical system further comprises a second diode 44 arranged in the second wake-up electrical line 33 and arranged for allowing an electric current to pass in a direction from the first wake-up electrical connection arrangement 29 to the second low-voltage DC bus 23, i.e. the diode's forward direction, while blocking any current from passing in a direction from the second low-voltage DC bus 23 to the first wake-up electrical connector arrangement 29, i.e. the diode's reverse direction.

As a result, current is blocked from passing from the first low-voltage DC bus 22 to the second low-voltage DC bus 23, or oppositely, via the first and second wake-up electrical lines 32, 32.

Clearly, in case the first and second wake-up electrical lines 32, 33 are mutually connected at the connection point 39, the first diode 43 is positioned in the part of the first wake-up electrical line 32 extending between the connection point 39 and the first low-voltage DC bus 22, and the second diode 44 is positioned in the part of the second wake-up electrical line 33 extending between the connection point 39 and the second low-voltage DC bus 22.

With reference again to FIG. 2, the on-board electrical system may further comprise a first fuse 45 arranged in the first wake-up electrical line 32, and a second fuse 46 arranged in the second wake-up electrical line 33. The purpose may for example be to protect the electrical components of the on-board electrical system 14 from damages caused by high currents.

In case the first and second wake-up electrical lines 32, 33 are mutually connected at the connection point 39, the first fuse 45 is positioned in the part of the first wake-up electrical line 32 extending between the connection point 39 and the first low-voltage DC bus 22, and the second fuse 46 is positioned in the part of the second wake-up electrical line 33 extending between the connection point 39 and the second low-voltage DC bus 22.

Figure 3:
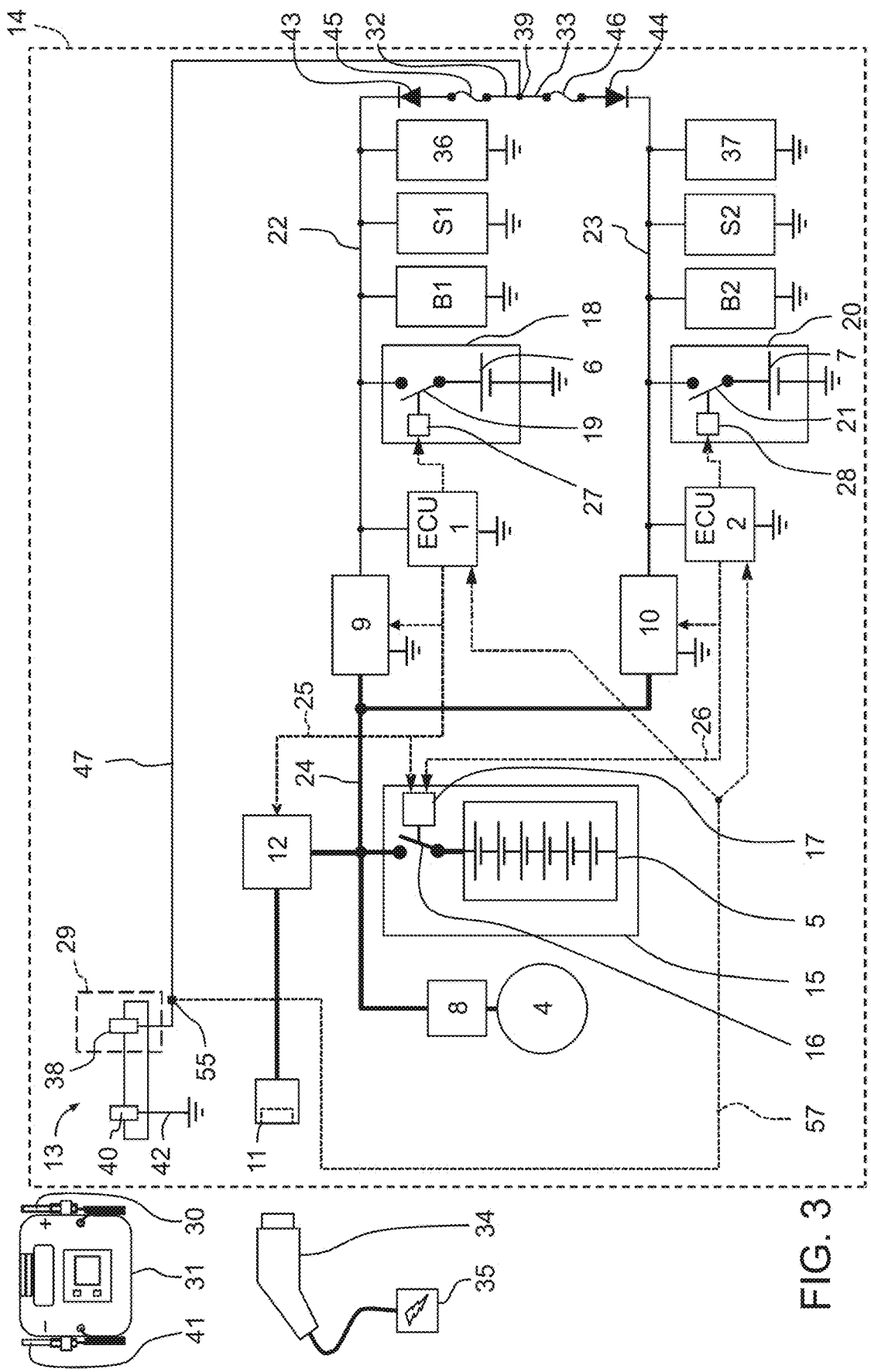

With reference to FIG. 3, the first and second wake-up electrical lines 32, 32 may have various types of design, form and implementations. For example, the connection point 39 may be located physically close to the first and second low-voltage DC buses 22, 23 for saving weight and cost, because thereby a single electrical line 47 is required for connecting the first wake-up electrical connector arrangement 29 with the connection point 39. However, the above-described position of the first diode 43 and first fuse 45 in the part of the first wake-up electrical line 32 extending between the connection point 39 and the first low-voltage DC bus 22 remain, as well as described position of the second diode 44 and second fuse 46 in the part of the second wake-up electrical line 33 extending between the connection point 39 and the second low-voltage DC bus 23.

The schematic layout of the high-voltage part of the on-board electrical system may depicted in FIG. 1-3 is merely some example embodiments thereof, and many variants are possible within the scope of the present disclosure. For example, the various electrical components may be more or less integrated in larger structures. Such integration of components may be cost-effective in terms of enabling a more compact design and sometimes also shared utilization of certain components, such as high-voltage switches etc.

Figure 4:
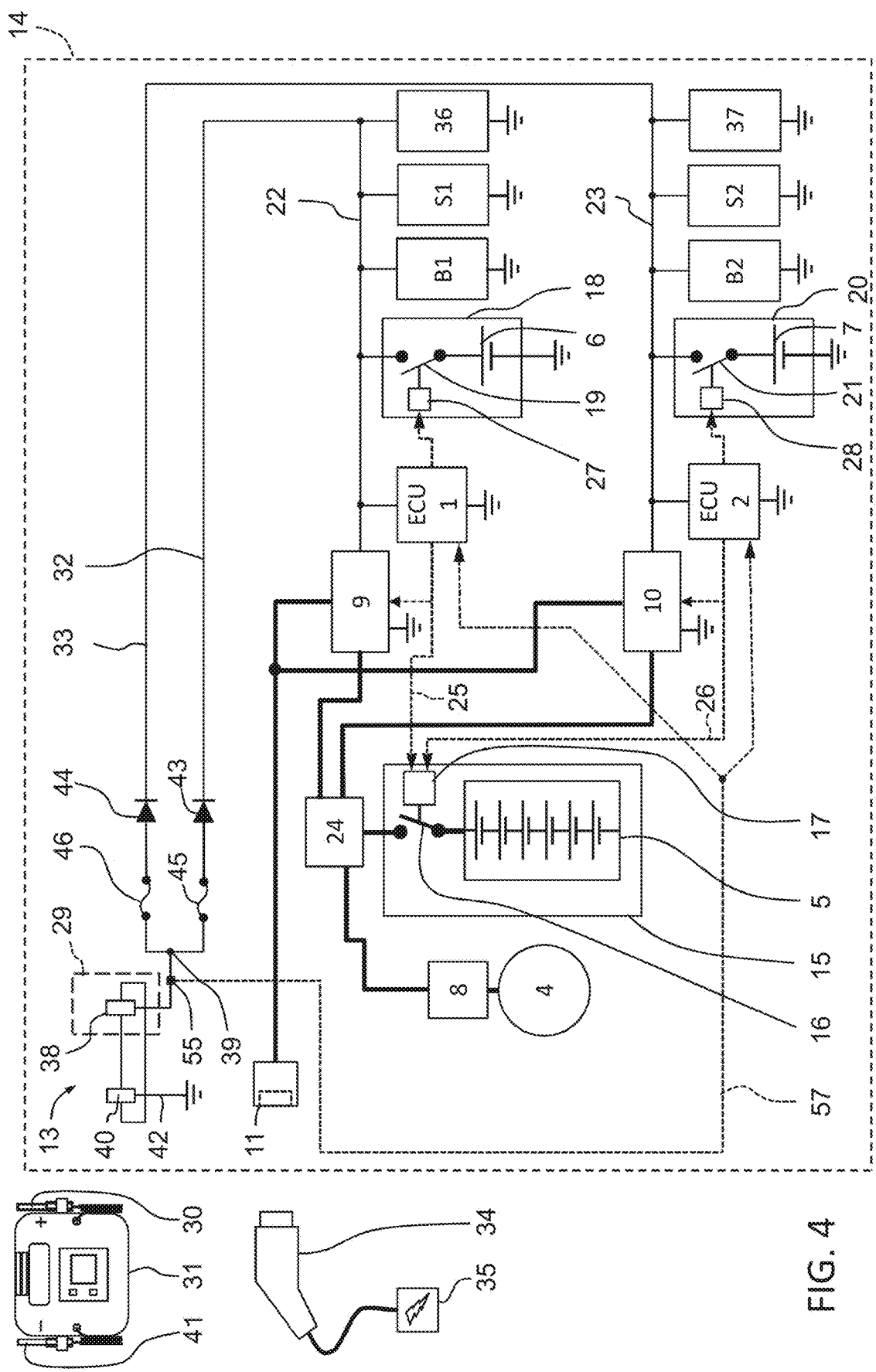

FIG. 4 shows an example layout of the electric system, in which the on-board charger 12 has been integrated into each of the first and second DC/DC converters 9, 10. Additional integration may involve integrating for example also the inverter into the each of the first and second DC/DC converters 9, 10. Furthermore, in the example of FIG. 4, the high-voltage DC bus 24 is at least partly implemented in form of power distribution Unit (PDU) that interconnects the DC/DC converters 9, 10, the inverter 8 and the high-voltage power supply 15.

Figure 5:
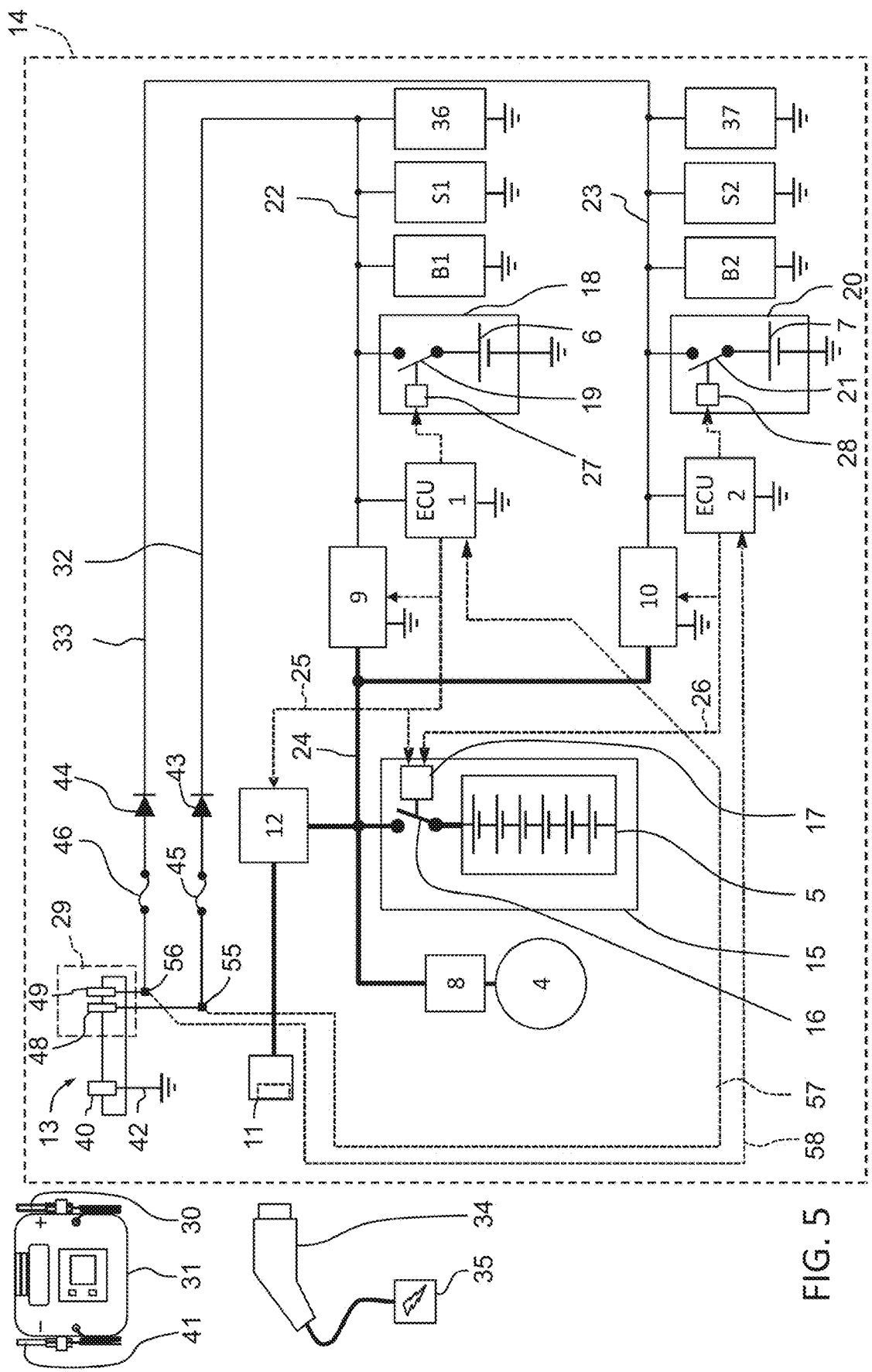

FIG. 5 shows a further example embodiment of the electrical circuit 14, wherein the current blocking structure is accomplished by having the first and second wake-up electrical lines 32, 33 normally disconnected from each other. This is accomplished by providing the first wake-up electrical connector arrangement 29 with first and second individual and mutually electrically disconnected connector members 48, 49, which for example may be implemented in form of two rigid post arranged close to each other, for example within a range of 5 cm, and therefore suitable for being jointly clamped by and connected to the positive clamp 30 of the low-voltage jump-starter device 31, such that the positive clamp 30 establishes an electrical connection between the first and second connector members 48, 49, and such that the first wake-up electrical line 32 connects the first connector member 48 with the first low-voltage DC bus 22, and such that the second wake-up electrical line 33 connects the second connector member 49 with the second low-voltage DC bus 23.

Thereby, the first and second low-voltage DC buses 22, 23 are normally, i.e. during normal operation, galvanically and electrically disconnected from each other, such that a cost-efficient and reliable current blocking structure may be accomplished.

In addition, by providing the first diode 43 and first fuse 45 in the first wake-up electrical line 32 extending between the first connector member 48 and the first low-voltage DC bus 22, and providing the second diode 44 and second fuse 46 in the second wake-up electrical line 33 extending between the second connector member 49 and the second low-voltage DC bus 23, the current blocking structure in form of two series connected and oppositely arranged diodes in the first and second wake-up electrical lines 32, 33 complements the galvanically isolated first and second connector members 48, 49.

Figure 7:
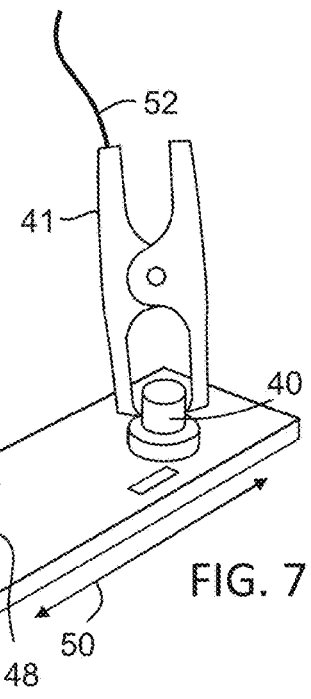

FIG. 7 shows an example embodiment of the wake-up electrical connector 13 described with reference to FIG. 6 for enabling temporary connection of an external booster to the on-board electrical circuit 14. In this example embodiment, the first wake-up electrical connector arrangement 29 comprises a single-piece first connector member 48 in form of single rigid post and a single-piece second connector member 49 in form of single rigid post, wherein both said first and second connector members 48, 49 are simultaneously clamped by the positive clamp 30, while the second wake-up electrical connector arrangement 40 in form of a single-piece rigid post is temporarily clamped by the negative clamp 41. Thereby, both the first and second master electronic control units ECU1, ECU2 may be powered up simultaneously using power from the jump-starter device 31.

Figure 8:
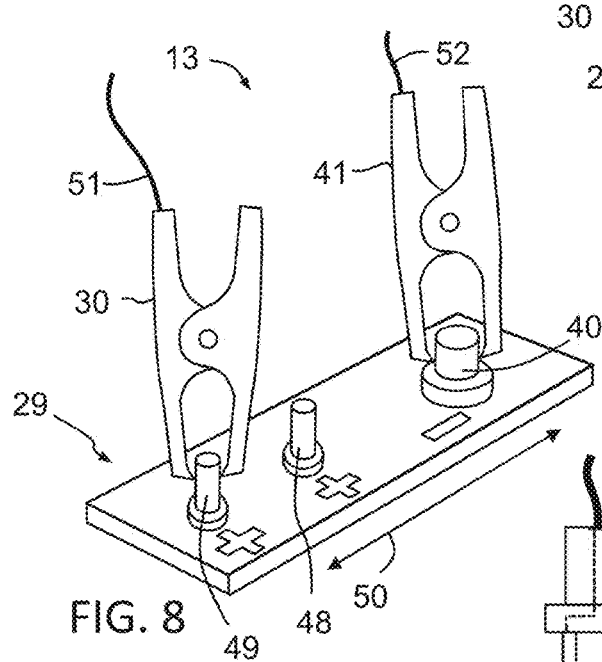

According to still a further example embodiment, the first wake-up electrical connector arrangement 29 comprises a single-piece first connector member 48 in form of single rigid post and a single-piece second connector member 49 in form of single rigid post, wherein said first and second connector members 48, 49 are clamped by the positive clamp 30 one by one, i.e. sequentially. This may for example be combined with a large space between the first and second connector members 48, 49, as depicted in FIG. 8, or simply be a matter of handling by the user and applied to for example the first wake-up electrical connector arrangement 29 according to FIG. 7.

Figure 9:
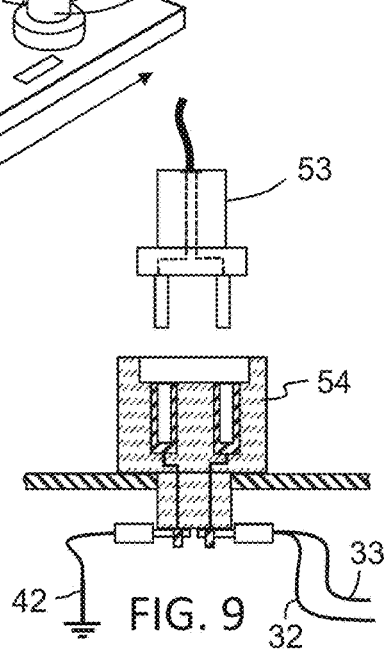

Still more alternatively, with reference to FIG. 9, the wake-up electrical connector 13 may be implemented in form of a plug 53 having at least a positive pole and a negative pole, and configured to be inserted into a corresponding socket 54. In this example embodiment, the first and second wake-up electrical lines 32, 33 are connected to a positive terminal of the socket 54 and the earth line 42 is connected to a negative terminal of the socket 54.

Figure 10:
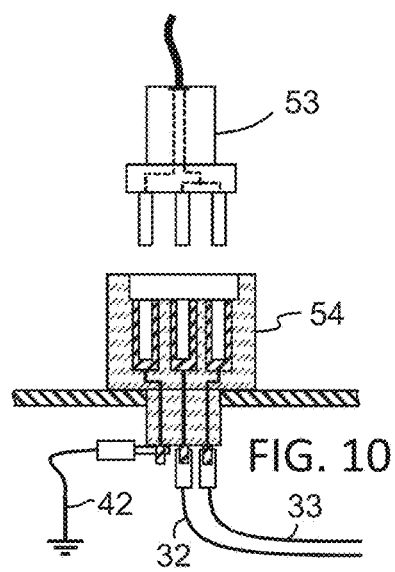

According to still a further alternative, with reference to FIG. 10, the wake-up electrical connector 13 may be implemented in form of a plug 53 having at least two positive poles and a negative pole, and configured to be inserted into a corresponding socket 54. In this example embodiment, the two positive poles are mutually joined, for example in the plug 53, and the two corresponding positive poles of the socket may be connected to the first and second wake-up electrical lines 32, 33, respectively. Thereby, the galvanic separation of the first and second wake-up electrical lines 32, 33 is accomplished, at least as long as the plug remains disconnected from the socket 54. The earth line 42 is connected to a negative terminal of the socket 54.

A problem that may occur when using the jump-starter device 31 for starting up the first and second master electronic control units ECU1, ECU2 is that the low-voltage electrical storage systems 6, 7 may experience a significant in-rush of charging current in connection with closing of the first and second electrical switches 19, 21, because the low-voltage electrical storage systems 6, 7 may have a low charge level and the jump-starter device 31 may have a large capacity while lacking a current regulator. A large in-rush current may have a damaging effect on various electrical components of the on-board electrical system 14, such as for example the first and second electrical switches 19, 21 and the first and second low-voltage electrical storage systems 6, 7.

The present disclosure provides various solutions for avoiding or at least reducing the risk for damages to electrical components while starting up the electric vehicle using an external the jump-starter device 31.

Common for the proposed solutions is generally that the first and second DC/DC converters 9, 10 are more appropriate for power supply to the first and second low-voltage DC buses 22, 23 during closing of the first and second electrical switches 19, 21, because the first and second DC/DC converters 9, 10 generally include current regulation, meaning that the maximal supplied current is limited, for example to a certain predetermined value. Thereby, the level of in-rush of charging current upon closing of the first and second electrical switches 19, 21 is significantly reduced, compared with a non-regulated low-voltage jump-starter device 31. However, the wake-up electrical connector 13 and the jump-starter device 31 are initially required for starting up the first and second master electronic control units ECU1, ECU2.

Furthermore, this design also enables use of a low-voltage jump-starter device 31 that is arranged to supply power independent of the detected voltage level at the connection terminals.

According to some example embodiments, starting up of vehicle having opened first and second electrical switches 19, 21, i.e. having shutdown first and second master electronic control units ECU1, ECU2, may require a user or service personnel to follow certain instructions, which the user or service personnel may obtain from for example an instruction manual. The instructions may for example involve connecting the external charging connector 34 of an external charging unit 35 to the on-board charging inlet 11, and subsequently or approximately simultaneously connecting the jump-starter device 31 to the wake-up electrical connector 13. The instructions may then state that the user or service personnel must disconnect the jump-starter device 31 from the wake-up electrical connector 13 after a certain time period, such as for example one minute or two minutes or the like, starting from the time point of connecting the jump-starter device 31 to the wake-up electrical connector 13.

In other words, the user or service personnel is instructed to connect the external charging connector 34 to the on-board charging inlet 11, and subsequently starting a timing clock when connecting the jump-starter device 31 to the wake-up electrical connector 13, and removing the disconnecting the jump-starter device 31 after a certain time period, or at least not after said time period.

In combination with these instructions, the first master electronic control unit ECU1 may be configured to, upon starting up of the first master electronic control unit ECU1 and detecting an opened first electrical switch 19, activating an on-delay-timer for delaying closing of the first electrical switch a certain delay time, such as for example three minutes; and subsequently closing the first electrical switch 19 after the delay time of the on-delay-timer has passed. Furthermore, the second master electronic control unit ECU2 may be configured to, upon starting up of the second master electronic control unit ECU2 and detecting an opened second electrical switch 21, activating an on-delay-timer for delaying closing of the second electrical switch 21 a certain delay time, such as for example three minutes; and subsequently closing the second electrical switch 21 after the delay time of the on-delay-timer has passed.

The instructions to the user or service personnel in combination with the above-described configuration of the first and second master electronic control units ECU1, ECU2, ensures with reasonably high likelihood that the jump-starter device 31 will be disconnected before the first and second electrical switches 19, 21 are closed, thereby eliminating the risk for a potentially damaging current in-rush to the first and second low-voltage power supplies 18, 20, and instead relying on power supply from only the current regulated first and second DC/DC converters 9, 10 during closing of the first and second electrical switches 19, 21.

Figure 12:
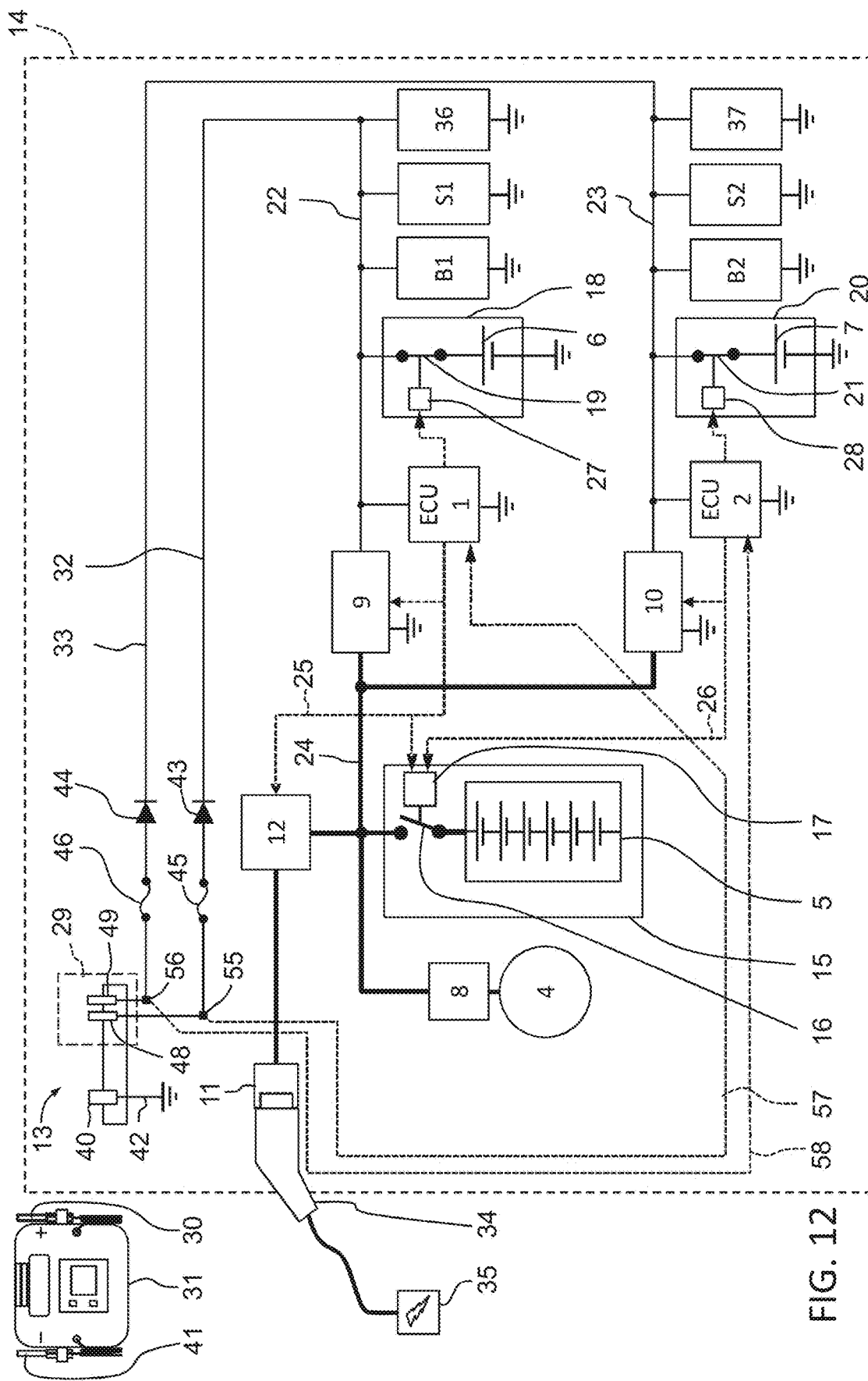

In other words, when the first and second low-voltage DC buses 22, 23 receives power from the jump-starter device 31 and the first and second master electronic control units ECU1, ECU2 has started-up, they are programmed to relatively immediately activate the on-board charger 12 and the first and second DC/DC converters 9, 10, thereby establishing a power supply from the external charging unit 35 to the first and second master electronic control units ECU1, ECU2 with power. At this stage, the jump-starter device 31 may be disconnected and for ensuring that the first and second electrical switches 19, 21 are not closed while the jump-starter device 31 is still connected and able to deliver electrical power to the first and second low-voltage power supplies 18, 20, the first and second master electronic control units ECU1, ECU2 are programmed for delaying closing of the first and second electrical switches 19, 21 until the jump-starter device 31 has been removed or disconnected from the on-board electric system 14. FIG. 12 schematically illustrates the operating state of the electrical system at time point after disconnection of the jump-starter device 31 and closing of the first and second electrical switches 19, 21.

The activation and execution of the on-delay-timer, i.e. the timer for keeping track of the delay time until the first and second electrical switches 19, 21 should be closed, is for example implemented in the software of the first and second master electronic control units ECU1, ECU2, respectively.

According to some example embodiments, the first and second master electronic control units ECU1, ECU2 may be configured to also take the State of Charge condition of the first and second low-voltage electrical storage systems 6, 7 into account when determining whether to delay closing of the first and second electrical switches 19, 21, because closing of the first and second electrical switches 19, 21 when the first and second low-voltage electrical storage systems 6, 7 have a relatively high charge level does generally not result in an in-rush of current from the jump-starter device 31 to for example the first and second low-voltage power supplies 18, 20. In other words, when the first and second low-voltage electrical storage systems 6, 7 have a relatively high charge level, there is no urgent need, or no need at all, for delaying the closing timing of the first and second electrical switches 19, 21.

The first and second master electronic control units ECU1, ECU2 may for example take State of Charge condition of the first and second low-voltage electrical storage systems 6, 7 into account by comparing a detected voltage level of the first and second low-voltage electrical storage systems 6, 7 with a predetermined voltage level, and activate the on-delay-time when said detected voltage level is below the predetermined voltage level, or a corresponding strategy for evaluation of the state of charge.

Consequently, the first master electronic control unit ECU1 may be configured to, upon starting up of the first master electronic control unit ECU1 and detecting an opened first electrical switch 19 and detecting a low State of Charge condition of the first low-voltage electrical storage system 6, activating an on-delay-timer for delaying closing of the first electrical switch 19 a certain delay time, and closing the first electrical switch 19 after the delay time of the on-delay-timer has passed. Furthermore, the second master electronic control unit ECU2 may be configured to, upon starting up of the second master electronic control unit ECU2 and detecting an opened second electrical switch 21 and detecting a low State of Charge condition of the second low-voltage electrical storage system 7; activating an on-delay-timer for delaying closing of the second electrical switch 21 a certain delay time; and closing the second electrical switch 21 after the delay time of the on-delay-timer has passed.

According to some example embodiments, a more reliable solution may be desired, which is not dependent on a user or service personnel correctly executing a certain start up instruction. This may for example be accomplished by implementing some type of detection and/or sensor apparatus configured for reliably and accurately indicating an ongoing power supply from the low-voltage jump-starter device 31 to the first and/or second low-voltage DC bus 22, 23 via the wake-up electrical connector 13. If an indication of an ongoing power supply from the jump-starter device 31 to the first and/or second low-voltage DC bus 22, 23 is determined, the first and/or second master electronic control unit ECU1, ECU2 is configured to delay closing of the first and/or second electrical switch 19, 21 at least until the connection status of the wake-up electrical connector 13 indicates absence of power supply from the low-voltage jump-starter device 31 to the first and/or second low-voltage DC bus 22, 23.

Said detection and/or sensor apparatus may for example include one or more sensors for determining whether an electrical connector or pair of clamps of a jump-starter device 31 is physically plugged in or connected to the first and/or second wake-up electrical connector arrangement 29, 40. This may for example be detected using a proximity sensor or a connection status sensor, or the like. The presence of such plugged-in or otherwise connected jump-starter device 31 may be used as strong indicator for occurrence of an in-rush current from the power supply from the low-voltage jump-starter device to the first and/or second low-voltage electrical storage system 6, 7 in case the first and/or second electrical switch 19, 21 be closed.

Alternatively, said detection and/or sensor apparatus may for example have one or more sensors for determining a voltage level at the first wake-up electrical connector arrangement 29. When the jump-starter device 31 is disconnected or simply not operational the voltage level at the first wake-up electrical connector arrangement 29 is generally about zero volt. However, when the jump-starter device 31 is connected and operational the voltage level at the first wake-up electrical connector arrangement 29 is generally above a certain voltage level, in particular above a predetermined threshold, such as for example above 10 volt. Provision of a voltage level above for example 10 volt may be used as strong indicator for occurrence of an in-rush current from the power supply from the low-voltage jump-starter device to the first and/or second low-voltage electrical storage system 6, 7 in case the first and/or second electrical switch 19, 21 be closed.

In the example embodiments of the electric system described with reference to FIGS. 2-4, a first voltage detection sensor 55 may be provided for detecting the voltage level upstream of the first and second diodes 43, 44, and connected to the first and second master electronic control units ECU1, ECU2 via a wired or wireless third data communication channel 57.

Figure 11:
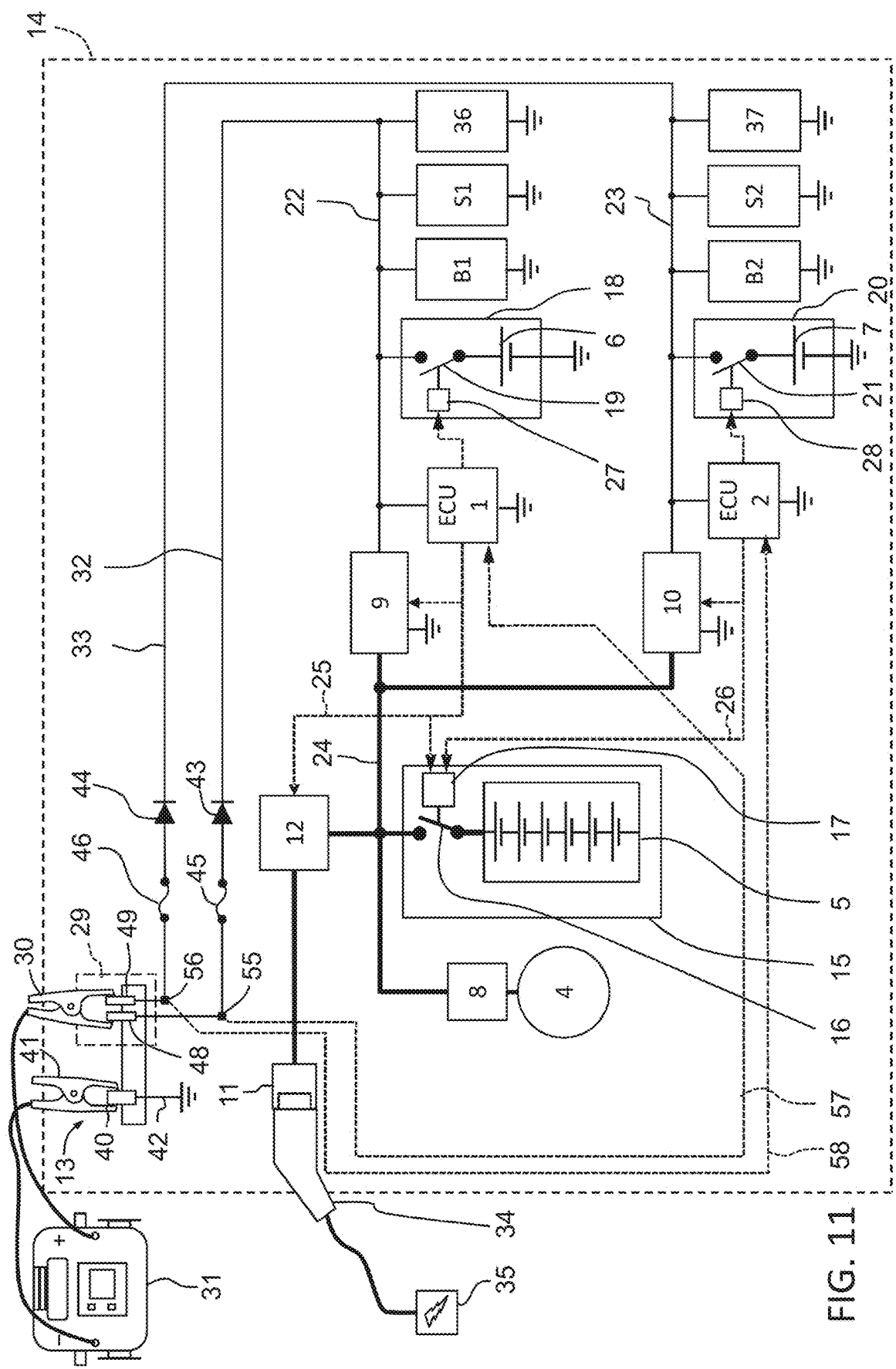
FIGS. 11-12 show schematically two connection states of an example embodiment of the electric system of the disclosure.

Correspondingly, in the example embodiments of the electric system described with reference to FIGS. 5, 11 and 12, a first voltage detection sensor 55 may be provided for detecting the voltage level upstream of the first diode 43 and connected to the first master electronic control units ECU1 via a wired or wireless third data communication channel 57, and a second voltage detection sensor 56 may be provided for detecting the voltage level upstream of the second diode 44 and connected to the second master electronic control units ECU2 via a wired or wireless fourth data communication channel 58.

Consequently, the first master electronic control unit may be configured to, upon starting up of the first master electronic control unit ECU1 and detecting an opened first electrical switch and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus.

Similarly, the second master electronic control unit may be configured to, upon starting up of the second master electronic control unit ECU2 and detecting an opened second electrical switch and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus.

Connection status indicating absence of power supply from the low-voltage jump-starter device refers herein for example a disconnected or shut-down power supply from the low-voltage jump-starter device.

As mentioned above, according to some example embodiments, the first and second master electronic control units ECU1, ECU2 may be configured to also take the State of Charge condition of the first and second low-voltage electrical storage systems 6, 7 into account when determining whether to delay closing of the first and second electrical switches 19, 21, because a potential in-rush is dependent on the state of charge of the first and second low-voltage electrical storage systems 6, 7. In other words, a relatively high charge level does generally not result in an in-rush of current from the jump-starter device 31 to for example the first and second low-voltage power supplies 18, 20, thereby triggering need for said delay only in case of low state of charge level of the first and second low-voltage electrical storage systems 6, 7.

Consequently, the first master electronic control unit ECU1 may be configured to, upon starting up of the first master electronic control unit ECU1 and detecting an opened first electrical switch 19 and detecting a low State of Charge condition of the first low-voltage electrical storage system 6 and detecting a connection status of the first wake-up electrical connector arrangement 29 indicating power supply from the low-voltage jump-starter device to the first low-voltage DC bus 22, delaying closing of the first electrical switch 19 at least until the connection status of the first wake-up electrical connector arrangement 29 indicates absence of power supply from the low-voltage jump-starter device 31 to the first low-voltage DC bus 22.

Furthermore, the second master electronic control unit may be configured to, upon starting up of the second master electronic control unit ECU2 and detecting an opened second electrical switch 21 and detecting a low State of Charge condition of the second low-voltage electrical storage system 7 and detecting a connection status of the first wake-up electrical connector arrangement 29 indicating power supply from the low-voltage jump-starter device 31 to the second low-voltage DC bus 23, delaying closing of the second electrical switch 21 at least until the connection status of the first wake-up electrical connector arrangement 29 indicates absence of power supply from the low-voltage jump-starter device 31 to the second low-voltage DC bus 23.

A further solution to the problem of high in-rush currents upon closing of the first and second electrical switches 19, 21 may involve providing a first wake-up line switch 59 in the first wake-up electrical line 32, and a second wake-up line switch 60 in the second wake-up electrical line 33, as schematically showed in the example embodiments of FIGS. 13 and 14. The first master electronic control unit ECU1 would then be configured for controlling operation of the first wake-up line switch 59, in particular by opening the first wake-up line switch 59 before the first electrical switch 19 is closed, such that high in-rush current from the low-voltage jump-starter device 31 to the first low-voltage electrical storage system 6 can be prevented. In the same way, the second master electronic control unit ECU2 would then be configured for controlling operation of the second wake-up line switch 60, in particular by opening the second wake-up line switch 60 before the second electrical switch 21 is closed, such that high in-rush current from the low-voltage jump-starter device 31 to the second low-voltage electrical storage system 7 can be prevented.

FIG. 15 illustrates schematically a further variation, in which a common wake-up line switch 61 is arranged in the line connecting the single connector member 38 with the connection point 39, and where both the first second master electronic control units ECU1, ECU2 would be configured for controlling operation of the common wake-up line switch 61 jointly, in particular by opening the common wake-up line switch 61 before any of the first and second electrical switches 19, 21 are closed, such that high in-rush current from the low-voltage jump-starter device 31 to any of the first and second low-voltage electrical storage systems 6, 7 can be prevented.

In some example embodiments, the first and second wake-up line switches 59, 60 provided in the first and second wake-up electrical lines 32, 33, as illustrated in FIGS. 13 and 14, may even replace the previously described first and second diodes 43, 44, because the first and second wake-up line switches 59, 60 may be set in open state by default, thereby effectively providing a galvanically separated first and second low-voltage DC buses 22, 23 during normal operation of the electric system, i.e. with disconnected low-voltage jump-starter device 31.

In some example embodiments, the first master electronic control unit ECU1 may additionally be configured for detecting an operating condition of the first DC/DC converter 9, and delaying closing of the first electrical switch at least until the first DC/DC converter 9 has started to supply a low-voltage output to the first low-voltage DC bus.

Similarly, in some example embodiments, the second master electronic control unit ECU2 may be configured for detecting an operating condition of the second DC/DC converter 10, and delaying closing of the second electrical switch 21 at least until the second DC/DC converter 10 has started to supply a low-voltage output to the second low-voltage DC bus 23.

Thereby, shut-down of the electric system 14 of the vehicle, caused by disconnection of the low-voltage jump-starter device 31 before the first and/or second DC/DC converters 9, 10 are operational, may be avoided.

According to some example embodiments, operation, i.e. opening/closing of the high-voltage switch 16, may be controlled jointly by the first and second master electronic control units ECU1, ECU2, or by each of the first and second master electronic control units ECU1, ECU2, separately, and the first and/or second master electronic control units ECU1, ECU2 may be configured for closing the high-voltage switch 16 first after the first and/or second low-voltage electrical storage system have been charged to a certain State of Charge, such as for example in the range of 10-50% SOC. Otherwise, if the high-voltage switch 16 is closed at about the same time as the first and second electrical switches 19, 21, most of the electrical power from the on-board charger 12 will flow to the high-voltage electrical power supply 15, thereby delaying charging of the first and second low-voltage power supplies 18, 20.

The present disclosure also relates to a method for starting an electric vehicle 1 having opened battery protective switches, as described above with reference to FIGS. 1-15. FIG. 16 shows the basic steps of the method for starting the vehicle 1, wherein a first step S10 includes connecting an external charging connector 34 of an external charging unit 35 to an on-board charging inlet 11 of the on-board electrical system 14, and connecting a connector 30, 53 of a low-voltage jump-starter device 31 to a first wake-up electrical connector arrangement 29 of the on-board electrical system 14. The method further comprises a second step S20 of supplying electrical power from the low-voltage jump-starter device 31 to the first low-voltage DC bus 22 of the on-board electrical system 14, via a first wake-up electrical line 32, for powering and wakening a first master electronic control unit ECU1, and/or supplying electrical power from the low-voltage jump-starter device 31 to the second low-voltage DC bus 23 of the on-board electrical system 14, via a second wake-up electrical line 33, for powering and wakening a second master electronic control unit ECU2. The method further comprises a third step S30 of wakening an on-board charger 12 that is operably connected to the on-board charging inlet 11 and wakening the first and/or second DC/DC converters for initiating power supply from the on-board charging inlet 11 to the first and/or second low-voltage bus. In addition, the method comprises a fourth step S40 of closing the first electrical switch and initiating charging of the first low-voltage electrical storage system with power from the first DC/DC converter, and/or closing the second electrical switch and initiating charging of the second low-voltage electrical storage system with power from the second DC/DC converter.

In other words, the first and second master electronic control units ECU1, ECU2 may thus be wakened by merely supplying power low-voltage power, such as 12V power, to the first and second master electronic control units ECU1, ECU2. Furthermore, the step of wakening the on-board charger 12 and the first and/or second DC/DC converters 9, 10 is performed by receiving proposer instructions from first and second master electronic control units ECU1, ECU2, respectively.

Thereby, a method for starting an electric system of an electric vehicle is accomplished, wherein the vehicle electric system has improved fault tolerance while also providing a solution for overcoming the deadlock associated with opened high voltage switch 16 and first and second low voltage switches 19, 21.

Furthermore, for reducing the risk for a potentially damaging in-rush current into the first and second low voltage electrical storage systems, it may be beneficial to disconnect the low-voltage jump-starter device before closing the first and/or second electrical switches 19, 21. In other words, according to some example embodiments of the method described above, the method may additionally include an intermediate step S35 of stopping or disconnecting power supply from the low-voltage jump-starter device to the first and/or second low-voltage DC bus before closing the first and/or second electrical switches 19, 21. This intermediate step 35 may for example be performed after the third step S30 of wakening an on-board charger 12 and before the fourth step S40 of closing the first and/or second electrical switches 19, 21.

Each of the redundant first and second master electronic control units ECU1, ECU2 may be a conventional electronic control unit having one or more data processors and any number of hardware components for conducting data or signal processing or for executing computer code stored in memory. Each of the first and second master electronic control units ECU1, ECU2 may have an associated data memory for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure.

Furthermore, modifications may be made to adapt the system and method of the disclosure to a particular situation or material without departing from the essential scope thereof.

Although discussed above as methods described by the flowchart of FIGS. 16 and 17, it should be appreciated that the order of the steps may be altered. For example, the activity defined in the second step S20 of supplying electrical power from the low-voltage jump-starter device 31 to the first and second low-voltage DC buses 22, 23 for powering and wakening the first and second master electronic control units ECU1, ECU2 may alternatively be performed before the activity of connecting an external charging connector 34 of an external charging unit 35 to an on-board charging inlet 11 of the on-board electrical system 14, as defined in the first step S10. Hence, the order of the steps and activities of the methods of the disclosure should not be interpreted as being strictly limited to order of steps and activities described with reference to FIGS. 16 and 17. Rather, the methods discussed are merely some example embodiments of the present disclosure as contemplated.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1. Vehicle
2. Vehicle body
3. Wheels
4. Electric propulsion motor
5. High-voltage electrical storage system
6. First low-voltage electrical storage system
7. Second low-voltage electrical storage system
8. Motor controller
9. First DC/DC converter
10. Second DC/DC converter
11. On-board charging inlet
12. On-board charger
13. Wake-up electrical connector arrangement
14. On-board electrical system
15. High-voltage electrical power supply
16. High-voltage switch
17. Battery management system
18. First low-voltage power supply
19. First electrical switch
20. Second low-voltage power supply
21. Second electrical switch
22. First low-voltage DC bus
23. Second low-voltage DC bus
24. High-voltage DC bus
25. First data communication line
26. Second data communication line
27. BMS of first power supply
28. BMS of second power supply
29. First wake-up electrical connector arrangement
30. Positive clamp
31. Low-voltage jump-starter device
32. First wake-up electrical line
33. Second wake-up electrical line
34. External charging connector
35. External charging unit
36. Load voltage load
37. Load voltage load
38. Single connector member
39. Connection point
40. Second wake-up electrical connector arrangement
41. Negative clamp
42. Earth line
43. First diode
44. Second diode
45. First fuse
46. Second fuse
47. Single electrical line
48. First connector member
49. Second connector member
50. Distance
51. Positive electrical cable
52. Negative electrical cable
53. Plug
54. Socket
55. First voltage detection sensor
56. Second voltage detection sensor
57. Third data communication channel
58. Fourth data communication channel
ECU1—First master electronic control unit
ECU2—Second master electronic control unit
S1—First steering modules
S2—Second steering modules
B1—First braking module
B2—Second braking module

What is claimed is:

1. An on-board electrical system for an electric vehicle comprising:
a high-voltage electrical power supply including a high-voltage electrical storage system connected in series with a high-voltage switch,
a first low-voltage power supply including a first low-voltage electrical storage system connected in series with a first electrical switch,
second low-voltage power supply including a second low-voltage electrical storage system connected in series with a second electrical switch,
a first DC/DC converter connected to the high-voltage electrical power supply and to the first low-voltage power supply via a first low-voltage DC bus,
a second DC/DC converter connected to the high-voltage electrical power supply and to the second low-voltage power supply via a second low-voltage DC bus, a first master electronic control unit connected to the first low-voltage DC bus for power supply and configured to controlling operation of the first electrical switch, a second master electronic control unit connected to the second low-voltage DC bus for power supply and configured to controlling operation of the second electrical switch, a first wake-up electrical connector arrangement suitable for being temporarily connected a low-voltage jump-starter device, a first wake-up electrical line connecting the first wake-up electrical connection arrangement with the first low-voltage DC bus, a second wake-up electrical line connecting the first wake-up electrical connector arrangement with the second low-voltage DC bus.

2. The on-board electrical system according to claim 1, further comprising a current blocking structure configured for preventing current from flowing from the first low-voltage DC bus to the second low-voltage DC bus, or oppositely, via the first and second wake-up electrical lines.

3. The on-board electrical system according to claim 1, further comprising:
a first diode positioned in the first wake-up electrical line and arranged for allowing an electric current to pass in a direction from the first wake-up electrical connection arrangement to the first low-voltage DC bus, while blocking any current from passing in a direction from the first low-voltage DC bus to the first wake-up electrical connector arrangement,
a second diode arranged in the second wake-up electrical line and arranged for allowing an electric current to pass in a direction from the first wake-up electrical connection arrangement to the second low-voltage DC bus, while blocking any current from passing in a direction from the second low-voltage DC bus to the first wake-up electrical connector arrangement.

4. The on-board electrical system according to claim 1, further comprising:
a first fuse arranged in the first wake-up electrical line, and
a second fuse arranged in the second wake-up electrical line.

5. The on-board electrical system according to claim 1, wherein the first wake-up electrical connector arrangement comprises first and second individual and mutually electrically disconnected connector members, wherein the first wake-up electrical line connects the first connector member with the first low-voltage DC bus, and wherein the second wake-up electrical line connects the second connector member with the second low-voltage DC bus, or
wherein the first wake-up electrical connector arrangement comprises a single connector member, which is suitable for being clamped by and connected to the positive clamp of a low-voltage jump-starter device, wherein the first wake-up electrical line connects the single connector member with the first low-voltage DC bus, and wherein the second wake-up electrical line connects the single connector member with the second low-voltage DC bus.

6. The on-board electrical system according to claim 1, wherein the first master electronic control unit is configured to, upon starting up of the first master electronic control unit and detecting an opened first electrical switch; activating an on-delay-timer for delaying closing of the first electrical switch a certain delay time; and closing the first electrical switch after the delay time of the on-delay-timer has passed,
and/or
wherein the second master electronic control unit is configured to, upon starting up of the second master electronic control unit and detecting an opened second electrical switch; activating an on-delay-timer for delaying closing of the second electrical switch a certain delay time; and closing the second electrical switch after the delay time of the on-delay-timer has passed.

7. The on-board electrical system according to claim 1, wherein the first master electronic control unit is configured to, upon starting up of the first master electronic control unit and detecting an opened first electrical switch and detecting a low State of Charge condition of the first low-voltage electrical storage system; activating an on-delay-timer for delaying closing of the first electrical switch a certain delay time; and closing the first electrical switch after the delay time of the on-delay-timer has passed,
and/or
wherein the second master electronic control unit is configured to, upon starting up of the second master electronic control unit and detecting an opened second electrical switch and detecting a low State of Charge condition of the second low-voltage electrical storage system; activating an on-delay-timer for delaying closing of the second electrical switch a certain delay time; and closing the second electrical switch after the delay time of the on-delay-timer has passed.

8. The on-board electrical system according to claim 1, wherein the first master electronic control unit is configured to, upon starting up of the first master electronic control unit and detecting an opened first electrical switch and detecting a connection status of the first wake-up electrical connector arrangement indicating power supply from the low-voltage jump-starter device to the first low-voltage DC bus; delaying closing of the first electrical switch at least until the connection status of the first wake-up electrical connector arrangement indicates absence of power supply from the low-voltage jump-starter device to the first low-voltage DC bus,
and/or
wherein the second master electronic control unit is configured to, upon starting up of the second master electronic control unit and detecting an opened second electrical switch and detecting a connection status of the first wake-up electrical connector arrangement indicating power supply from the low-voltage jump-starter device to the second low-voltage DC bus; delaying closing of the second electrical switch at least until the connection status of the first wake-up electrical connector arrangement indicates absence of power supply from the low-voltage jump-starter device to the second low-voltage DC bus.

9. The on-board electrical system according to claim 1, wherein the first master electronic control unit is configured to, upon starting up of the first master electronic control unit and detecting an opened first electrical switch and detecting a low State of Charge condition of the first low-voltage electrical storage system and detecting a connection status of the first wake-up electrical connector arrangement indicating power supply from the low-voltage jump-starter device to the first low-voltage DC bus; delaying closing of the first electrical switch at least until the connection status of the first wake-up electrical connector arrangement indicates absence of power supply from the low-voltage jump-starter device to the first low-voltage DC bus, and/or wherein the second master electronic control unit is configured to, upon starting up of the second master electronic control unit and detecting an opened second electrical switch and detecting a low State of Charge condition of the second low-voltage electrical storage system and detecting a connection status of the first wake-up electrical connector arrangement indicating power supply from the low-voltage jump-starter device to the second low-voltage DC bus; delaying closing of the second electrical switch at least until the connection status of the first wake-up electrical connector arrangement indicates absence of power supply from the low-voltage jump-starter device to the second low-voltage DC bus.

10. A method for starting an electric vehicle having an on-board electrical system comprising a high-voltage electrical power supply including a high-voltage electrical storage system connected in series with a high-voltage switch, a first low-voltage power supply including a first low-voltage electrical storage system connected in series with a first electrical switch, a second low-voltage power supply including a second low-voltage electrical storage system connected in series with a second electrical switch, a first DC/DC converter connected to the high-voltage electrical power supply and to the first low-voltage power supply via a first low-voltage DC bus, and a second DC/DC converter connected to the high-voltage electrical power supply and to the second low-voltage power supply via a second low-voltage DC bus, the method comprising:

connecting an external charging connector of an external charging unit to an on-board charging inlet of the on-board electrical system, and connecting a low-voltage jump-starter device to a first wake-up electrical connector arrangement of the on-board electrical system, supplying electrical power from the low-voltage jump-starter device to the first low-voltage DC bus of the on-board electrical system, via a first wake-up electrical line, for powering and wakening a first master electronic control unit, and/or supplying electrical power from the low-voltage jump-starter device to the second low-voltage DC bus of the on-board electrical system, via a second wake-up electrical line, for powering and wakening a second master electronic control unit, wakening an on-board charger that is operably connected to the on-board charging inlet and wakening the first and/or second DC/DC converters for initiating power supply from the on-board charging inlet to the first and/or second low-voltage buses, closing the first electrical switch and initiating charging of the first low-voltage electrical storage system with power from the first DC/DC converter, and/or closing the second electrical switch and initiating charging of the second low-voltage electrical storage system with power from the second DC/DC converter.

11. The method according to claim 10, further comprising the step of stopping power supply from the low-voltage jump-starter device to the first and/or second low-voltage DC buses before closing the first and/or second electrical switches.

12. The method according to claim 10, wherein the step of closing the first and/or second electrical switches involves:

detecting operating state of the first electrical switch, and upon detecting an opened first electrical switch; activating an on-delay-timer for delaying closing of the first electrical switch a certain delay time; and closing the first electrical switch after the delay time of the on-delay-timer has passed, and/or detecting operating state of the second electrical switch, and upon detecting an opened second electrical switch; activating an on-delay-timer for delaying closing of the second electrical switch a certain delay time; and closing the second electrical switch after the delay time of the on-delay-timer has passed.

13. The method according to claim 10, wherein the step of closing the first and/or second electrical switches involves:

detecting operating state of the first electrical switch and State of Charge condition of the first low-voltage electrical storage system, and upon detecting an opened first electrical switch and detecting a low State of Charge condition of the first low-voltage electrical storage system; activating an on-delay-timer for delaying closing of the first electrical switch a certain delay time; and closing the first electrical switch after the delay time of the on-delay-timer has passed, and/or detecting operating state of the second electrical switch and State of Charge condition of the second low-voltage electrical storage system, and upon detecting an opened second electrical switch and detecting a low State of Charge condition of the second low-voltage electrical storage system; activating an on-delay-timer for delaying closing of the second electrical switch a certain delay time; and closing the second electrical switch after the delay time of the on-delay-timer has passed.

14. The method according to claim 10, wherein the step of closing the first and/or second electrical switches involves:

detecting operating state of the first electrical switch and connection status of the first wake-up electrical connector arrangement indicating power supply from the low-voltage jump-starter device to the first low-voltage DC bus; and upon detecting an opened first electrical switch and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus, and/or detecting operating state of the second electrical switch and connection status of the first wake-up electrical connector arrangement indicating power supply from the low-voltage jump-starter device to the second low-voltage DC bus; and upon detecting an opened second electrical switch and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus.

15. The method according to claim 10, wherein the step of closing the first and/or second electrical switches involves:
  detecting operating state of the first electrical switch, State of Charge condition of the first low-voltage electrical storage system and connection status of the first wake-up electrical connector arrangement indicating power supply from the low-voltage jump-starter device to the first low-voltage DC bus; and
  upon detecting an opened first electrical switch and detecting a low State of Charge condition of the first low-voltage electrical storage system and detecting a connection status of the first wake-up electrical connector arrangement indicating power supply from the low-voltage jump-starter device to the first low-voltage DC bus, delaying closing of the first electrical switch at least until the connection status of the first wake-up electrical connector arrangement indicates absence of power supply from the low-voltage jump-starter device to the first low-voltage DC bus,
and/or
detecting operating state of the second electrical switch, State of Charge condition of the second low-voltage electrical storage system and connection status of the first wake-up electrical connector arrangement indicating power supply from the low-voltage jump-starter device to the second low-voltage DC bus; and
upon detecting an opened second electrical switch and detecting a low State of Charge condition of the second low-voltage electrical storage system and detecting a connection status of the first wake-up electrical connector arrangement indicating power supply from the low-voltage jump-starter device to the second low-voltage DC bus, delaying closing of the second electrical switch at least until the connection status of the first wake-up electrical connector arrangement indicates absence of power supply from the low-voltage jump-starter device to the second low-voltage DC bus.

\* \* \* \* \*